United States Patent
Kato et al.

(10) Patent No.: US 7,188,722 B2
(45) Date of Patent: Mar. 13, 2007

(54) ARTICLE CARRYING APPARATUS

(75) Inventors: Heizaburo Kato, Shizuoka (JP); Toshinao Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 0 days.

(21) Appl. No.: 11/260,050

(22) Filed: Oct. 26, 2005

(65) Prior Publication Data

US 2006/0180495 A1    Aug. 17, 2006

(30) Foreign Application Priority Data

Oct. 26, 2004    (JP)    ............................. 2004-310751

(51) Int. Cl.
*B65G 25/04*    (2006.01)
(52) U.S. Cl. .................... 198/750.8; 198/767
(58) Field of Classification Search ............ 198/750.1, 198/750.14, 750.8, 766, 767
See application file for complete search history.

(56) References Cited

U.S. PATENT DOCUMENTS

| | | | |
|---|---|---|---|
| 3,910,422 A * | 10/1975 | Zierpka | 198/621.3 |
| 4,567,979 A * | 2/1986 | Hoehn | 198/747 |
| 5,046,602 A * | 9/1991 | Smalley et al. | 198/750.8 |
| 5,178,258 A | 1/1993 | Smalley et al. | |
| 5,351,807 A * | 10/1994 | Svejkovsky | 198/750.8 |
| 6,708,815 B2 * | 3/2004 | Kato | 198/750.8 |

FOREIGN PATENT DOCUMENTS

| | | |
|---|---|---|
| GB | 760836 | 11/1956 |
| JP | 2003-040424 | 2/2003 |

OTHER PUBLICATIONS

European Search Report dated Mar. 6, 2006.

* cited by examiner

*Primary Examiner*—James R. Bidwell
(74) *Attorney, Agent, or Firm*—John J. Penny; Scott B. Weston; Edwards Angell Palmer & Dodge

(57) ABSTRACT

An article carrying apparatus is capable of inhibiting a force that acts on the apparatus due to a vibration being applied to its carry section in order to carry an article. The article carrying apparatus includes: a carry section for linearly restricting a carrying direction of an article to be carried; a cam mechanism for applying a vibration to the carry section by transmitting, to the carry section, a reciprocating linear motion having at least a carrying direction component in the carrying direction, wherein the vibration causes the article to be carried in the carrying direction; an enclosure section for supporting the cam mechanism; and a balancer for inhibiting a force that acts on the enclosure section due to the cam mechanism applying the vibration to the carry section.

13 Claims, 15 Drawing Sheets

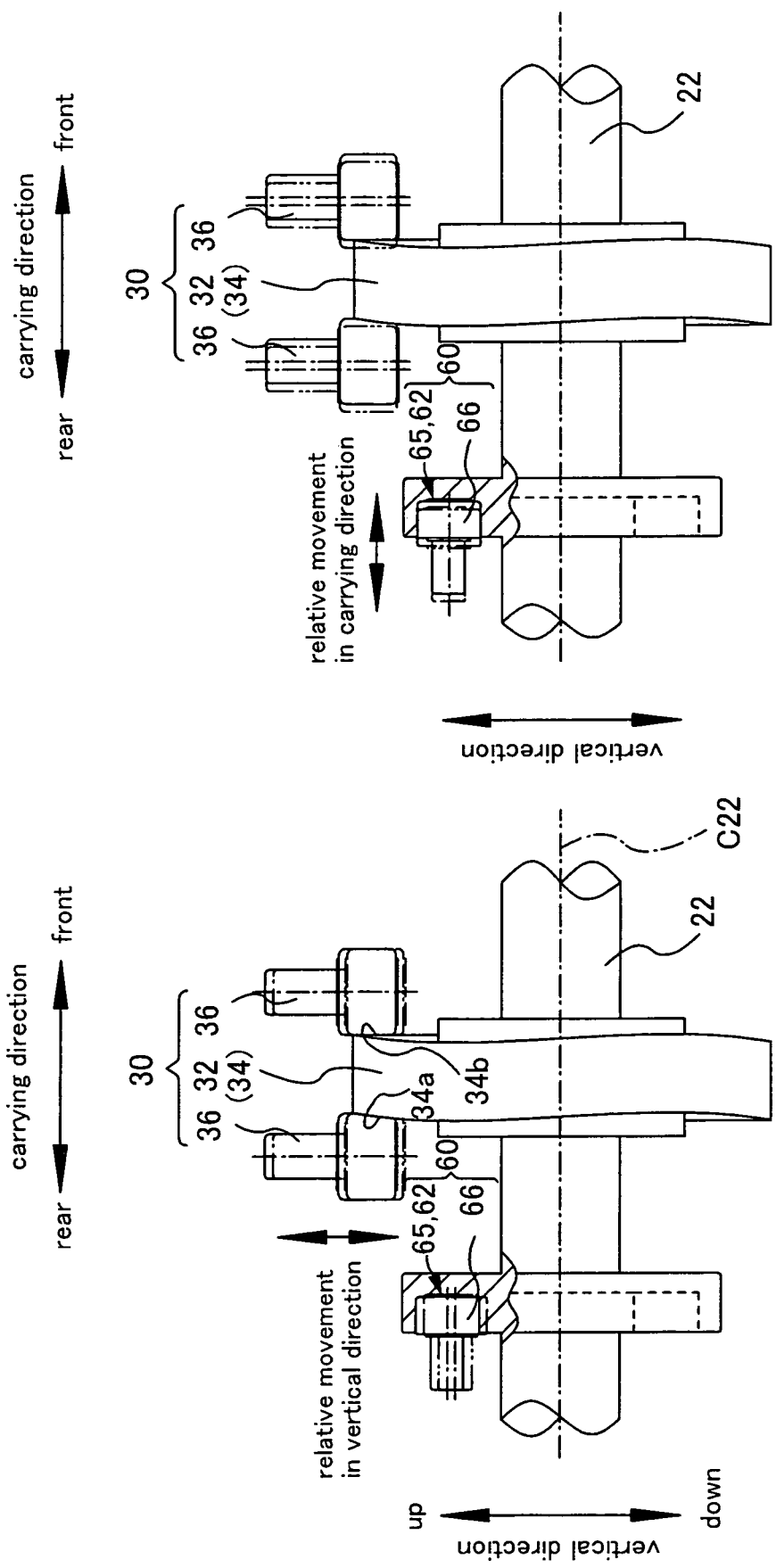

<right weight>
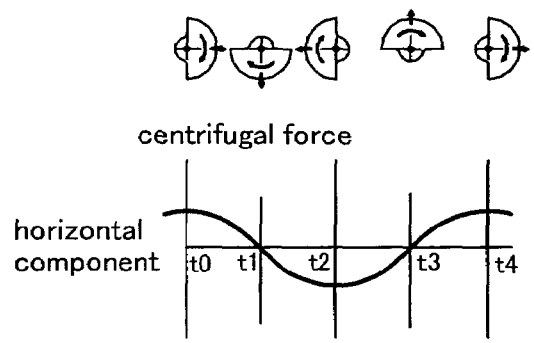
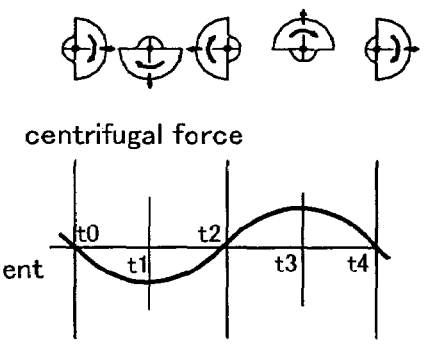
<left weight>
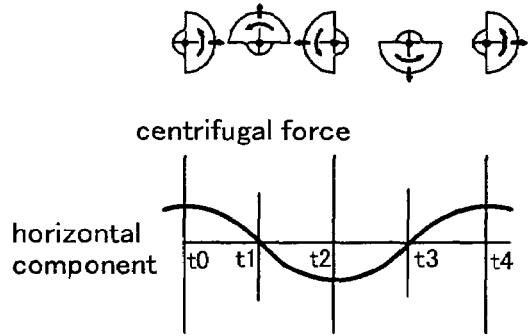
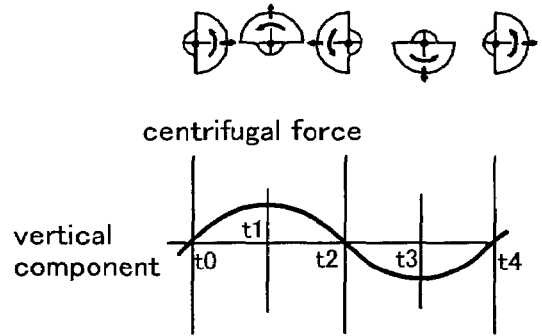
FIG. 12

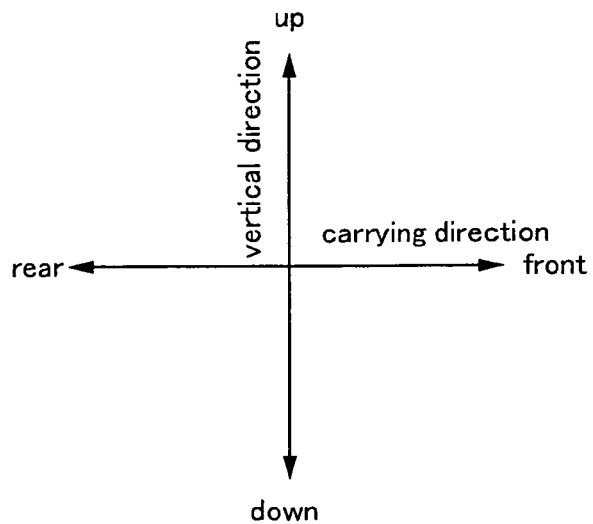
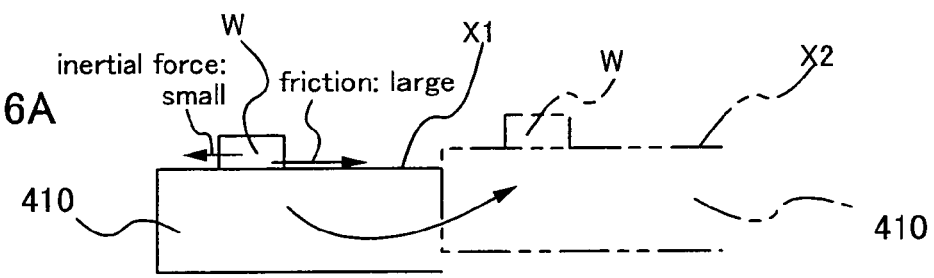
FIG. 16A
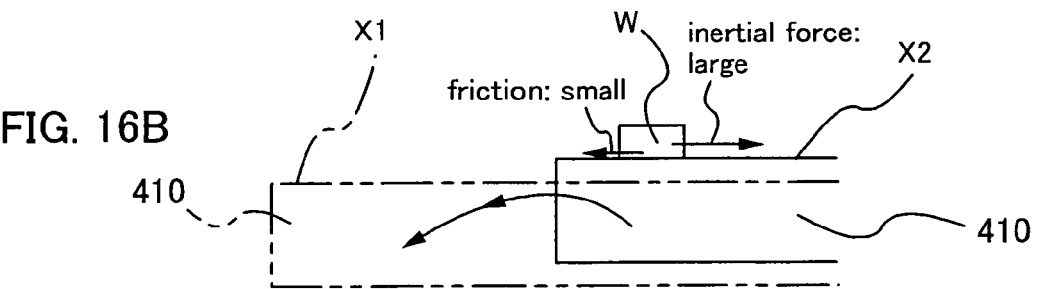
FIG. 16B
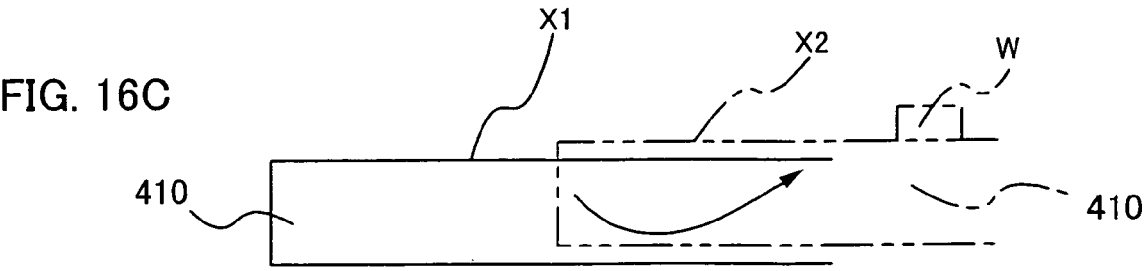
FIG. 16C

ARTICLE CARRYING APPARATUS

CROSS-REFERENCE TO RELATED APPLICATIONS

The present application claims priority upon Japanese Patent Application No. 2004-310751 filed on Oct. 26, 2004, which is incorporated herein by reference.

BACKGROUND OF THE INVENTION

1. Field of the Invention

The present invention relates to article carrying apparatuses.

2. Description of the Related Art

Conventionally, various types of article carrying apparatuses for lining up articles such as bulk components in rows while carrying them and supplying the articles one at a time have been proposed. Such apparatuses are generally called "feeders," and various types of feeders exist, including vibration- and belt-type feeders, although vibration-type feeders are the most common. A vibration-type feeder is an apparatus for carrying an article placed on a carry section, which vibrates, by exploiting for example the phenomenon of relative sliding of the article with respect to the carry section.

One example of such a vibration-type feeder is a linear feeder that carries articles over a straight path. This linear feeder has, for example, a carry section for carrying an article and a cam device, and is configured such that the carry section is supported at the top of a plate spring installed vertically on either end of a housing serving as the base of the cam device and such that a cam of a cam mechanism provided on the housing and a cam follower provided in the carry section are engaged with each other. A driving force of the cam mechanism is input to cause a carry table to vibrate (i.e., carry out a reciprocating linear motion) in a predetermined direction, and thus the article on the carry section is moved in the predetermined direction.

The carrying mechanism of such a linear feeder is described below with reference to FIG. 16A to FIG. 16C. FIG. 16A is a diagram for describing forces that act on the article when the carry section moves from a first position toward a second position, FIG. 16B is a diagram for describing forces that act on the article when the carry section moves from the second position toward the first position, and FIG. 16C. is a diagram for describing the position of the article when the carry section has returned to the first position.

This feeder is provided with a carry section 410 that linearly restricts the carrying direction to a straight line, and the carry section 410 vibrates between the second position X2 and the first position X1 set respectively to the front and the rear in the carrying direction (hereinafter, this is also referred to as "reciprocating movement"). As shown in FIG. 16A, when moving toward the forward second position X2 during reciprocating movement, relative sliding of the article W with respect to the carry section 410 is inhibited so that the article W moves together with the carry section 410. On the other hand, as shown in FIG. 16B, when moving toward the rear first position X1, the article W slides relative to the carry section 410 and only the carry section 410 moves to the first position X1 while the article W remains at the forward second position X2. By repeating this reciprocating movement, as shown in FIG. 16C, the article W is fed forward with respect to the carry section 410 in small increments, thereby achieving carrying of the articles (see JP 2003-40424A, for example).

In the conventional linear feeder described above, carrying of the articles is achieved by causing the carry section to vibrate. Thus, vibration of the carry section also is transmitted to the housing via the cam mechanism, which serves as a driving section for causing the carry section to vibrate. In other words, even when the linear feeder has the ability to carry the articles properly, there is a risk that the articles may not be carried properly due to the housing vibrating. For example, when the linear feeder is placed on a table or the like having low rigidity, the vibration transmitted to the housing is amplified by the table and causes the linear feeder itself placed thereon to vibrate significantly, and thus there is a risk that the articles may not be carried properly. Moreover, there also is a risk that noise may occur due to vibration of the table or the housing.

SUMMARY OF THE INVENTION

The present invention was arrived at in light of these issues of the conventional art, and it is an object thereof to provide an article carrying apparatus that is capable of inhibiting a force that acts on the apparatus due to vibration being applied to the carry section in order to carry the article.

A main invention for achieving the object is an article carrying apparatus including: a carry section for linearly restricting a carrying direction of an article to be carried; a cam mechanism for applying a vibration to the carry section by transmitting, to the carry section, a reciprocating linear motion having at least a carrying direction component in the carrying direction, wherein the vibration causes the article to be carried in the carrying direction; an enclosure section for supporting the cam mechanism; and a balancer for inhibiting a force that acts on the enclosure section due to the cam mechanism applying the vibration to the carry section.

Features of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein:

FIG. 6A is a diagram for illustrating how a first cam mechanism does not impede reciprocating movement of the output section in the vertical direction, and FIG. 6B is a diagram for illustrating how a second cam mechanism does not impede reciprocating movement of the output section in the carrying direction;

FIG. 12 is a diagram for describing centrifugal forces generated due to rotational motion of two weights;

FIG. 16A is a diagram for describing forces that act on an article when a carry section moves from a first position toward a second position, FIG. 16B is a diagram for describing forces that act on the article when the carry section moves from the second position toward the first position, and FIG. 16C is a diagram for describing the position of the article when the carry section has returned to the first position.

DETAILED DESCRIPTION OF THE INVENTION

Figure 1:
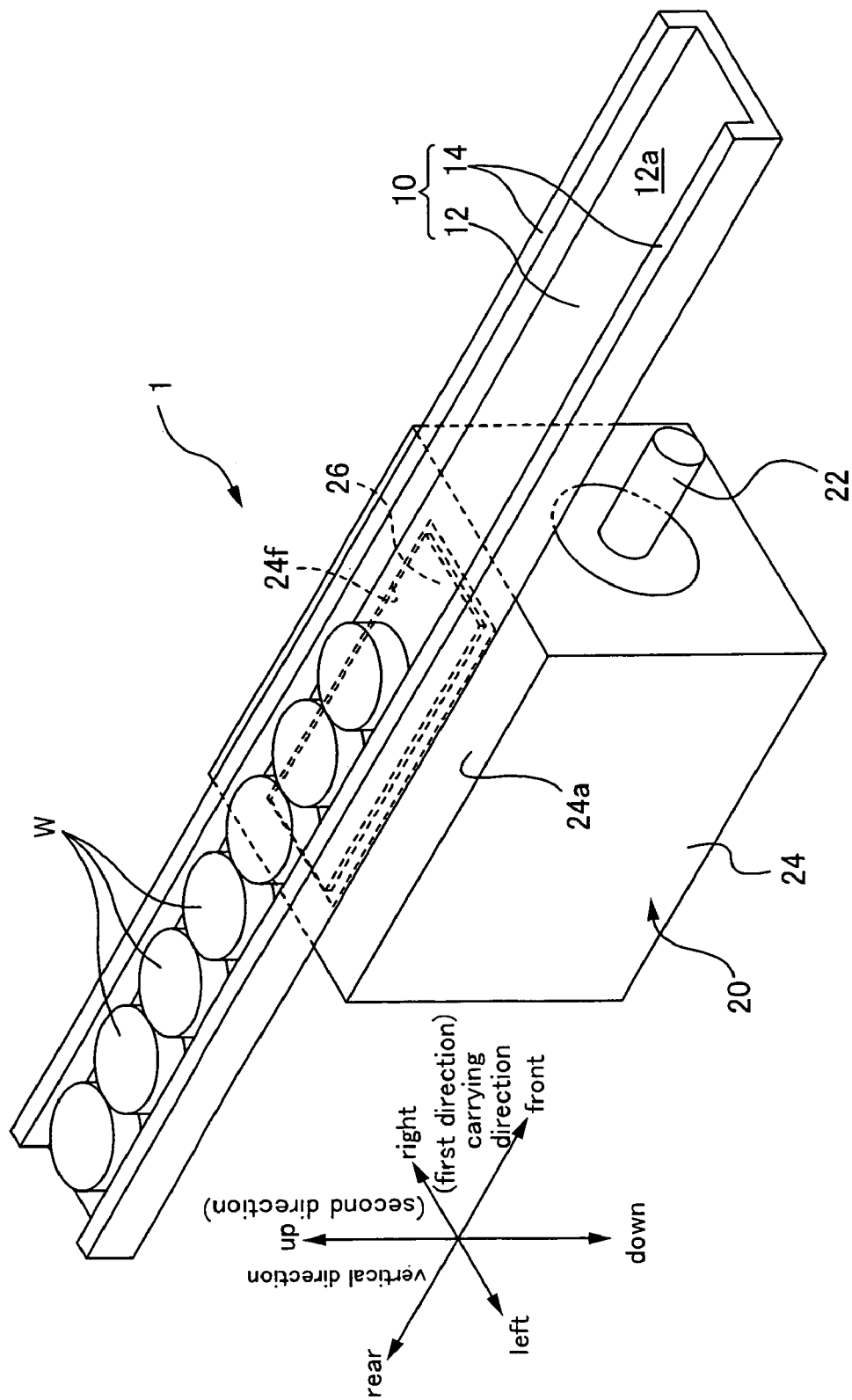
FIG. 1 is a perspective view showing an example of an article carrying apparatus.

At least the following matters will be made clear by the explanation in the present specification and the description of the accompanying drawings.

An aspect of the invention is an article carrying apparatus including: a carry section for linearly restricting a carrying direction of an article to be carried; a cam mechanism for applying a vibration to the carry section by transmitting, to the carry section, a reciprocating linear motion having at least a carrying direction component in the carrying direction, wherein the vibration causes the article to be carried in the carrying direction; an enclosure section for supporting the cam mechanism; and a balancer for inhibiting a force that acts on the enclosure section due to the cam mechanism applying the vibration to the carry section.

With such an article carrying apparatus, the force that acts on the enclosure section due to application of vibration to the carry section during carrying of the article can be inhibited by the balancer. That is, the force that acts on the enclosure section when vibration is applied to the carry section is reduced, so that the enclosure section is less prone to vibration. For this reason, vibration that causes the entire article carrying apparatus to vibrate is inhibited, and the article can be carried properly, and further, generation of noise due to vibration also can be inhibited.

In this article carrying apparatus, it is preferable that the balancer is a mechanism in which a center of gravity of a weight having a predetermined mass is moved in a direction opposite to the reciprocating linear motion of the carry section.

With such an article carrying apparatus, the center of gravity of the weight having a predetermined mass of the balancer is moved in a direction opposite to the reciprocating linear motion of the carry section, so that the carry section and the weight are moved in opposite directions, and forces that occur due to the respective movements of the carry section and the weight are cancelled. That is, the force that occurs due to the movement of the weight acts so as to cancel the force that occurs due to the movement of the carry section, so that the force that acts on the enclosure section due to application of vibration to the carry section can be inhibited reliably.

In this article carrying apparatus, it is preferable that the balancer is a mechanism in which the weight is rotated around a rotation shaft that is orthogonal to the carrying direction, and the rotation shaft is provided in a position different from the center of gravity of the weight and supported on the enclosure section.

With such an article carrying apparatus, the weight is rotated about the rotation shaft provided in a different position from its center of gravity, so that a centrifugal force that acts in a predetermined direction can be generated by rotating the weight. Since the rotation shaft is orthogonal to the carrying direction, when the weight is rotated, the center of gravity of the weight is moved in the opposite direction of the direction of the reciprocating linear motion of the carry section, and it is possible to cause the centrifugal force that occurs at this time to act so as to cancel the inertial force that occurs due to the reciprocating linear motion of the carry section.

In this article carrying apparatus, it is preferable that the rotation shaft is provided along a horizontal direction.

With such an article carrying apparatus, the centrifugal force generated by the balancer acts in the vertical direction (up/down direction) and the carrying direction. Thus, the centrifugal force does not act in the horizontal direction that is orthogonal to the carrying direction and that would make the article be carried along a winding path, so that the article can be carried more accurately.

In this article carrying apparatus, it is preferable that a plurality of the weights are provided.

With such an article carrying apparatus, the mass of the weight can be adjusted in association with the mass of the carry section by changing the number of weights. For this reason, it is possible to construct a balancer in which the mass of the weight is changed easily to generate an appropriate force corresponding to the force that occurs due to the movement of the carry section. Thus, vibration that is transmitted to the enclosure section due to application of vibration to the carry section can be inhibited suitably.

In this article carrying apparatus, it is preferable that the plurality of weights are divided into a first weight group and a second weight group; the first weight group and the second weight group are rotated in opposite directions; and when the centers of gravity of the weight groups are positioned in alignment with the rotation shaft in the carrying direction, the center of gravity of the first weight group and the center of gravity of the second weight group are positioned on the same side with respect to the rotation shaft, and when the centers of gravity of the weight groups are positioned in alignment with the rotation shaft in a direction perpendicular to the carrying direction, the center of gravity of the first weight group and the center of gravity of the second weight group are positioned on opposite sides with the rotation shaft interposed therebetween.

With such an article carrying apparatus, regarding the weights that are divided into two groups, when the centers of gravity of the two weight groups are positioned in alignment with the rotation shaft in the carrying direction, the centers of gravity of the first weight group and the second weight group are positioned on the same side with respect to the rotation shaft in the carrying direction, so that the centrifugal forces generated by rotating the two weight groups act in the same direction. Thus, the centrifugal force generated by rotating the weight can act efficiently in the direction opposite to the moving direction of the carry section in the carrying direction. Moreover, when the centers of gravity of the weight groups are positioned in alignment with the rotation shaft in the direction perpendicular to the carrying direction, the centers of gravity of the first weight group and the second weight group are positioned on opposite sides with the rotation shaft interposed therebetween, so that the centrifugal forces generated by rotating the respective weight groups act in opposite directions to each other. That is, the centrifugal forces generated by the respective weights act so as to cancel each other. For this reason, the force that is generated by rotating the weights and that acts in the direction perpendicular to the carrying direction can be reduced. Since the first weight group and the second weight group are rotated in opposite directions, a balancer that acts efficiently in the horizontal direction and that does not generate any unnecessary force in the vertical direction during carrying of the article can be realized by shifting the phase of each weight by 180° with respect to the other.

In this article carrying apparatus, it is preferable that the total mass of the first weight group and the total mass of the second weight group are set to be equal.

With such an article carrying apparatus, the centrifugal forces respectively generated by the two weight groups can be made equal easily. For this reason, when the first weight group and the second weight group are positioned on opposite sides with the rotation shaft interposed therebetween, the centrifugal forces due to the respective groups can be cancelled by each other so as not to act on the enclosure section.

In this article carrying apparatus, it is preferable that the total mass of the first weight group and the total mass of the second weight group are set to be different from each other.

With such an article carrying apparatus, the centrifugal forces respectively generated by the two weight groups can be made different from each other easily. That is,the magnitude of the centrifugal force generated by rotating either one of the first weight group and the second weight group can be greater than that of the centrifugal force generated by rotating the other. For this reason, when the first weight group and the second weight group are positioned on opposite sides with the rotation shaft interposed therebetween, it is possible to cause a force corresponding to the difference between the centrifugal force generated by rotating either one of the first weight group and the second weight group and the centrifugal force generated by rotating the other to act on the enclosure section. That is, even when the first weight group and the second weight group are positioned on opposite sides with the rotation shaft interposed therebetween, the force that occurs due to the motion of the carry section, for example, and that acts on the enclosure section can be inhibited.

In this article carrying apparatus, it is preferable that the number of the weights in each of the first and second weight groups is one.

With such an article carrying apparatus, at least two weights are provided, so that by rotating the two weights in opposite directions, a balancer that acts efficiently in the horizontal direction and that does not generate any unnecessary force in the vertical direction can be realized with the simplest configuration.

In this article carrying apparatus, it is preferable that the weight is provided with a first gear that rotates around the rotation shaft; an input shaft for inputting a rotational motion from a predetermined drive source to the cam mechanism is provided with a second gear; and the first gear and the second gear engage with each other.

With such an article carrying apparatus, the balancer can be operated by rotating the input shaft for inputting a driving force to the cam mechanism for causing the carry section to perform the reciprocating linear motion. That is, it is not necessary to provide an input section for the driving force for operating the balancer, and the balancer can be operated with a simple configuration. In particular, in order to move the carry section and the weight in opposite directions, the phase of the reciprocating linear motion of the carry section has to be matched with that of the rotational motion of the balancer. Because the balancer is driven by the input shaft of the cam mechanism that drives the carry section, the phase of the reciprocating linear motion of the carry section can be matched with that of the rotational motion of the balancer easily and appropriately. Thus, the force that acts on the enclosure section can be inhibited more efficiently.

In this article carrying apparatus, it is preferable that the cycle of the reciprocating linear motion of the carry section matches with the cycle of rotation of the weight.

With such an article carrying apparatus, by letting the phase in the carrying direction of the reciprocating linear motion of the carry section and the phase in the carrying direction when the weight is rotated be in antiphase with each other, the carry section and the weight are moved in opposite directions. For this reason, the force that acts due to the reciprocating linear motion of the carry section and the force that acts due to the rotational motion of the weight can be cancelled by causing them to act in opposite directions in the carrying direction.

In this article carrying apparatus, it is preferable that the number of rotations of the weight is an integral multiple of the number of rotations of the input shaft.

With such an article carrying apparatus, both the carry section and the weight are operated by the driving force input from the input shaft, so that when the input shaft completes one rotation and returns to its original position, the weight also returns to its initial position. For this reason, it is possible to always move the carry section and the weight in reverse directions in the carrying direction regardless of the amount of rotation of the input shaft.

In this article carrying apparatus, it is preferable that the weights that rotate in opposite directions to each other are arranged at positions where the input shaft is interposed therebetween.

With such an article carrying apparatus, the two weights are on opposite sides with the input shaft interposed therebetween. That is, the first gears, which the two weights respectively have, engage with the second gear, which the input shaft has, so that they are rotated in opposite directions to each other. Thus, the two weights can be rotated in opposite directions easily.

According to the present invention, the force that acts on the apparatus when vibration is applied to the carry section in order to carry the article can be inhibited.

===Overview of Article Carrying Apparatus===

First, an overview of a linear feeder serving as an article carrying apparatus is described with reference to FIGS. 1 to 3.

Figure 2:
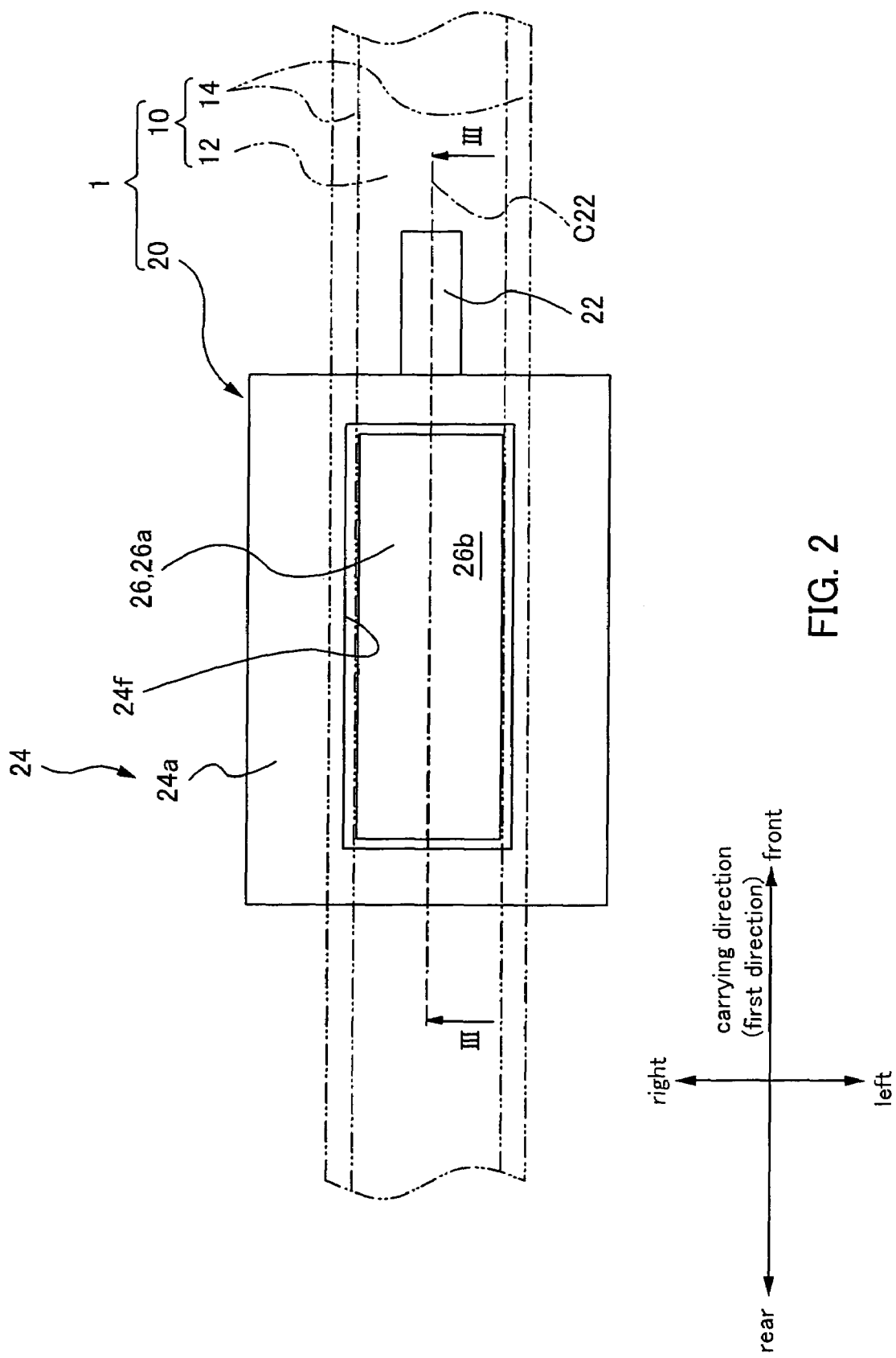
FIG. 2 is an external top view showing an example of the article carrying apparatus.
Figure 3:
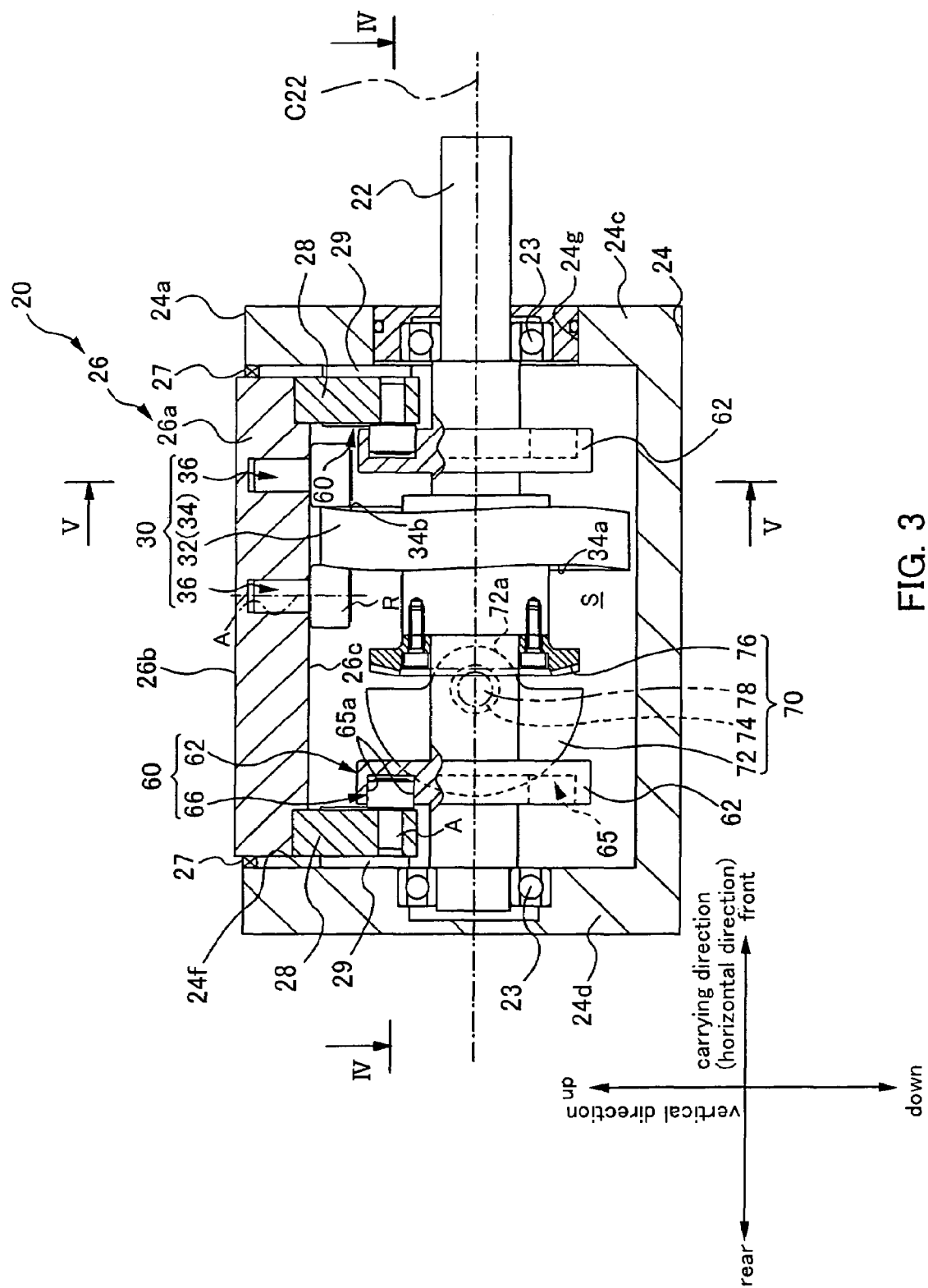
FIG. 3 is a vertical sectional view taken in the arrow direction along the line III—III in FIG. 2.

FIG. 1 is a perspective view showing an example of the article carrying apparatus, FIG. 2 is an external top view thereof, and FIG. 3 is a vertical sectional view taken in the arrow direction along the line III—III in FIG. 2.

As shown in these drawings, a linear feeder 1 serving as an article carrying apparatus has a carry section 10 for linearly restricting the carrying direction of an article to be carried to a straight line, and a vibration applying mechanism 20 that applies vibration to the carry section 10. The vibration applying mechanism 20 has two cam mechanisms 30 and 60 for applying vibration to the carry section 10, a housing 24 serving as an enclosure section for supporting the cam mechanism 30, and a balancer 70 for inhibiting a force that acts on the housing 24 due to the cam mechanism 30 applying vibration to the carry section 10.

In this linear feeder 1, vibration is obtained by synthesizing reciprocating linear motions created by the two cam mechanisms 30 and 60, and applied to the carry section 10. That is, the first cam mechanism 30 converts the motion received from a predetermined drive source (not shown) into reciprocating linear motion in a first direction that has at least a carrying direction component and transmits this to the carry section 10. The second cam mechanism 60 converts the motion received from a predetermined drive source (not shown) into reciprocating linear motion in a second direction that has at least the component of a direction perpendicular to the carrying direction and transmits this to the carry section 10. That is, vibration produced by the two cam mechanisms 30 and 60 causes the article to slide relative to the carry section 10 as discussed in the section describing the background arts.

The state of this relative sliding can be controlled by two methods including a first method of changing the inertial force that acts on the article W itself during reciprocating movement, and a second method of changing the friction that occurs between the article W and the carry section 10 during reciprocating movement. In this linear feeder 1, the inertial force that acts on the article W itself is controlled by the first cam mechanism 30, and the friction that occurs between the article W and the carry section 10 is controlled by the second cam mechanism 60. That is, the reciprocating linear motion of the first direction and the reciprocating linear motion of the second direction can each be independently set to a desired reciprocating linear motion through the design of the later-described cam curve of the first cam mechanism 30 and through the design of the later-described cam curve of the second cam mechanism 60, respectively. That is, a given motion path within a two-dimensional plane defined by the first direction and the second direction can be expressed through the design of the cam curves, and the article carrying apparatus 1 has an excellent degree of freedom with regard to setting the motion path. Thus, it is possible to apply vibration that is not limited to a simple motion path but rather is composed of a complex motion path to the carry section 10, and as a result it is possible to apply to the carry section 10 a vibration that is most suited to the required parameters, such as the type of the article W to be carried and the carrying capacity.

It should be noted that the following description is made under the assumption that, as shown in FIG. 1, the first direction matches with the carrying direction and that the second direction matches with the direction perpendicular to the carrying direction, but in no way is this a limitation, and for example it is also possible for the reciprocating linear motion of the first direction to include direction components other than of the carrying direction, and similarly, it is also possible for the reciprocating linear motion of the second direction to include direction components other than of the direction perpendicular to the carrying direction.

However, preferably the above assumption is adopted. This is because if the reciprocating linear motions of the first direction and the second direction respectively include only a carrying direction component and only a component of the direction perpendicular to the carrying direction, then when setting the first and second direction reciprocating linear motions, they can be done so independently without being affected whatsoever by the other reciprocating linear motion. As a result, the vibration of the carry section 10, which is obtained by synthesizing these two reciprocating linear motions, can be easily set to a desired motion path.

Moreover, this linear feeder 1 has the balancer 70 for inhibiting a force that acts on the housing 24 due to the cam mechanism 30 applying vibration to the carry section 10. This balancer 70 is a weight moving mechanism in which the centers of gravity of weights 72 having a predetermined mass are moved in the opposite direction of the reciprocating linear motion of the carry section 10, and each weight 72 rotates around a rotation shaft 74 that lies along the horizontal direction. Each rotation shaft 74 is located in a different position from the center of gravity of the respective weight 72, and is supported on the housing 24. It is set so that during rotation of the weights 72, when the centers of gravity of the weights 72 and the rotation shafts 74 are aligned in the carrying direction, the centers of gravity of the weights 72 are positioned on the same side with respect to the rotation shafts 74, whereas when the centers of gravity of the weights 72 and the rotation shafts 74 are aligned in the direction perpendicular to the carrying direction, the centers of gravity of the weights 72 are on opposite sides with the rotation shafts 74 interposed therebetween. Thus, by rotating the weights 72, a centrifugal force that acts in a direction opposite from the inertial force that occurs when the article W moves in the carrying direction is generated, thereby allowing the force that acts on the housing 24 to be inhibited.

Also, the following description is made with the understanding that the carrying direction is the horizontal direction and the direction perpendicular to the carrying direction is the vertical direction, but in no way is this a limitation. For example, it is also possible for the carrying direction to be tilted vertically with respect to the horizon by a predetermined angle so as to carry the article W in an obliquely upward direction or an obliquely downward direction.

Further, in the embodiments described below, as shown in FIG. 3, a configuration in which a drive source (not shown) is used in common for the two cam mechanisms 30 and 60 (not shown ) and the balancer 70, that is, a configuration in which the motion from a single drive source is input to the cam mechanisms 30 and 60 and the balancer 70 via a single input shaft 22, is used as an example, but in no way is this a limitation, and for example it is also possible to provide a dedicated drive source for each or any of the two cam mechanisms 30 and 60 and the balancer 70.

However, the configuration in which a single drive source is used in common is preferable. This is because a same input motion allows the reciprocating linear motion due to the first cam mechanism 30, the reciprocating linear motion due to the second cam mechanism 60, and the rotational motion of the balancer 70 to be synchronized with ease.

===Embodiment of Linear Feeder===

Figure 4:
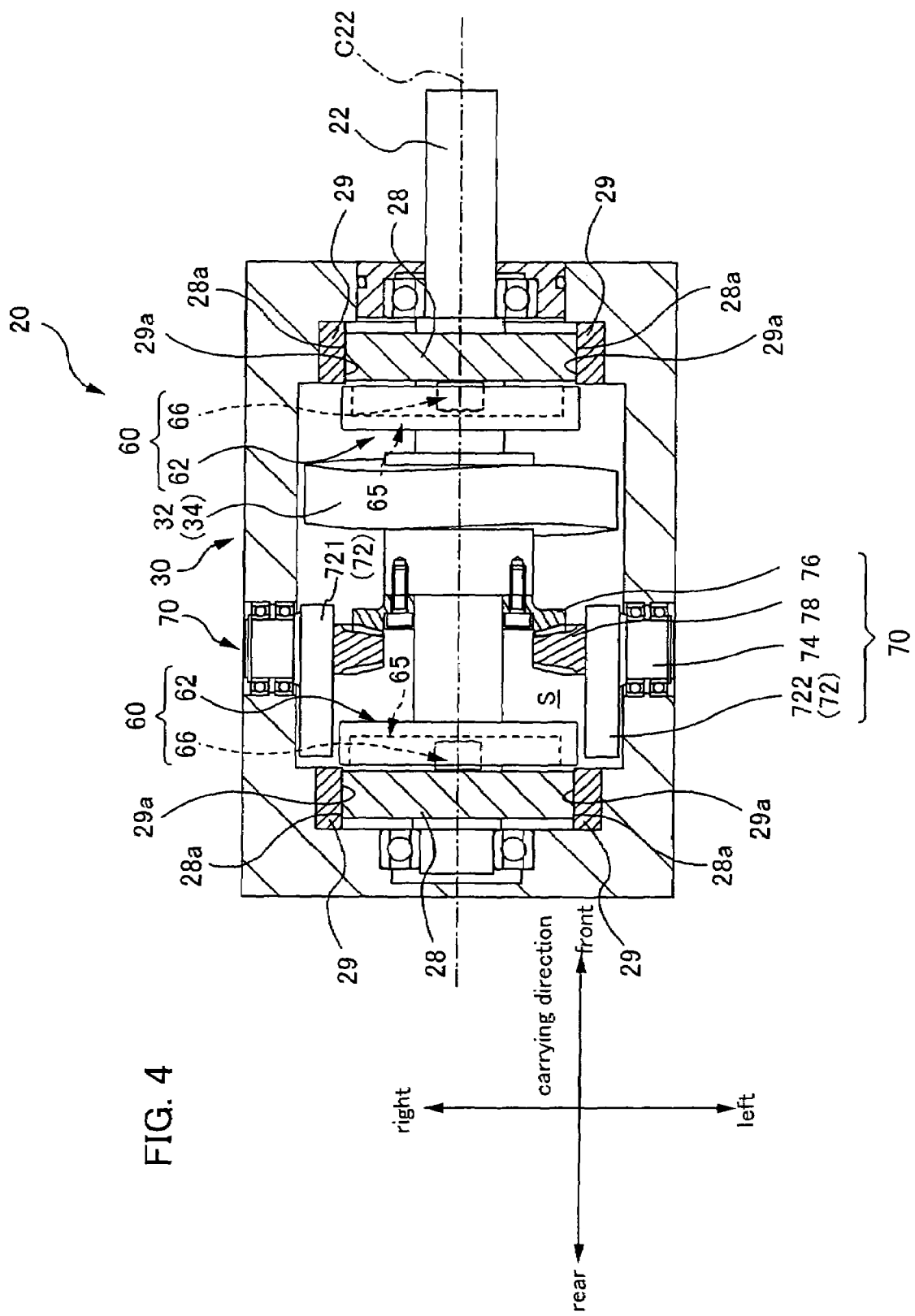
FIG. 4 is a transverse sectional view taken in the arrow direction along the line IV—IV in FIG. 3.
Figure 5A:
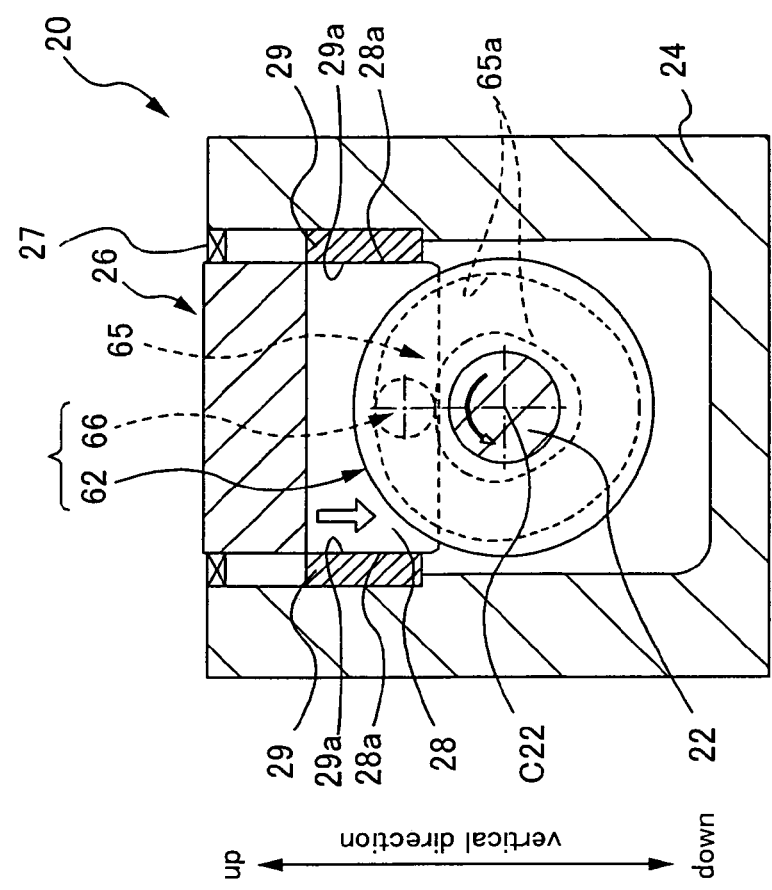
FIG. 5A is a vertical sectional view taken in the arrow direction along the line V—V in FIG. 3, showing a state in which an output section is in the top dead center.
Figure 5B:
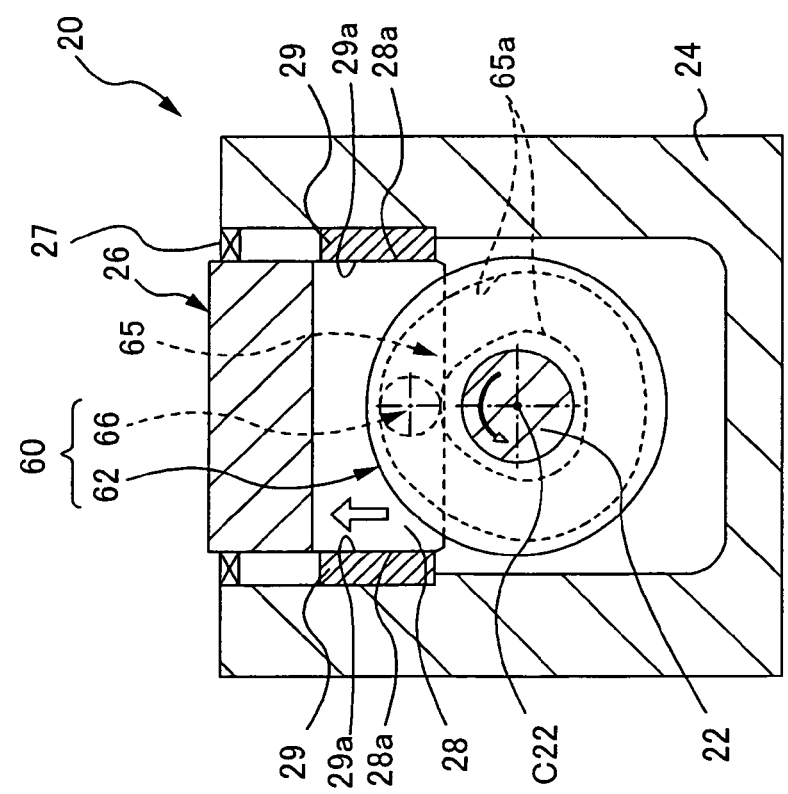
FIG. 5B is a vertical sectional view taken in the arrow direction along the line V—V in FIG. 3, showing a state in which the output section is in the bottom dead center.

FIGS. 4 through 5B are diagrams for describing an embodiment of the linear feeder. FIG. 4 is a transverse sectional view taken in the arrow direction along the line IV—IV in FIG. 3. FIG. 5A is a vertical sectional view taken in the arrow direction along the line V—V in FIG. 3, showing a state in which an output section is in the top dead center, and FIG. 5B is a vertical sectional view taken in the arrow direction along the line V—V in FIG. 3, showing a state in which the output section is in the bottom dead center. It should be noted that in the sectional views, some of the portions are depicted as side views and/or top views, and in all drawings, hatching has been added along the cutting plane.

As shown in FIG. 1, for the sake of convenience, in the following description, the carrying direction may also be expressed using "front/rear" and the vertical direction may also be expressed by "up/down." Further, the direction that is orthogonal to the carrying direction and the vertical direction is expressed as "left/right."

(1) Carry Section

As shown in FIG. 1 and FIG. 2, the carry section 10 has, as a main member 12, an elongate belt-shaped flat plate that has a horizontal, flat upper face 12a. The upper face 12a of the main member 12 functions as a carry face over which the article is carried, and thus the carrying direction is in the horizontal direction along the lengthwise direction of the main member 12 and the normal line direction of the carry face 12a is in the vertical direction.

Projecting sections 14 are formed continuously on both sides in the left-right direction of the upper face 12a of the main member 12 over the entire length of the main member 12 in the lengthwise direction, and this pair of projecting sections 14 linearly restricts the carrying direction of the article to a straight line.

(2) Vibration Applying Mechanism

The vibration applying mechanism 20 supports the carry section 10 while vibrating the carry section 10 based on a predetermined motion path, and is disposed below the carry section 10. It should be noted that the motion path is a path within a two-dimensional plane defined by the carrying direction and the vertical direction and is obtained by synthesizing the reciprocating linear motions in these two directions.

The vibration applying mechanism 20 is provided with a substantially oblong box-shaped housing 24 having a substantially rectangular opening 24f in its upper face wall 24a, an output section 26 that is disposed at a position where it covers the opening 24f and that is for supporting the carry section 10, a first cam mechanism 30 and a second cam mechanism 60 that are disposed within the housing 24 and that are for applying the motion of the motion path to the output section 26, a balancer 70 for inhibiting a force that acts on the housing 24 due to the cam mechanism 30 applying vibration to the carry section 10, and a single input shaft 22 for inputting the rotational motion from the drive source to the cam mechanisms 30 and 60 and the balancer 70.

(2-A) Input Shaft

As shown in FIG. 3, the input shaft 22 is a substantially round bar member arranged with its axis C22 direction along the carrying direction. At its ends the input shaft 22 is supported on a front face wall 24c and a rear face wall 24d of the housing 24 via bearings 23, allowing the input shaft 22 to freely rotate about its axis with respect to the housing 24.

It should be noted that one end portion of the input shaft 22 is accommodated within the housing 24, whereas its other end portion protrudes to the outside through a through hole 24g formed in the front face wall 24c of the housing 24. This other end portion is connected to a drive source (not shown) such as a motor via a suitable coupling (not shown), and the rotational motion about its axis is input from that drive source to the input shaft 22.

It should be pointed out that first and second cams 32 and 62 of the first and second cam mechanisms 30 and 60, and a second bevel gear 76 that engages with a first bevel gear 78 formed in each weight 72 so as to transmit the motive power for rotating the weight 72 constituting the balancer 70 are formed at the outer circumference of the input shaft 22, although these are discussed later.

(2-B) Output Section

As shown in FIG. 2, the output section 26 is disposed inward of the opening 24f of the upper face wall 24a, and has, as a main member 26a, a flat plate member that is slightly smaller than the opening 24f.

An attachment face for fixedly attaching the lower face of the carry section 10 is formed in an upper face 26b of the output section main member 26a, and the carry section 10 when fastened to this attachment face functions as a single member with the output section 26 and moves over the same motion path as the output section 26.

As shown in FIG. 3, an oblong lift member 28 is provided on a lower face 26c of the output section main member 26a. The lift member 28 has two functions. Its first function is to transmit reciprocating linear motion in the vertical direction that is output from the second cam mechanism 60, which is arranged below the output section main member 26a, to the output section main member 26a, and this function is described in the section describing the second cam mechanism 60.

Its second function is to serve as a guide structure that restricts movement of the output section main member 26a in the left-right direction so as to guide the output section main member 26a such that it can move only in the carrying direction and the vertical direction. That is, as shown in FIG. 4 and FIG. 5A, end faces 28a in the left-right direction of the lift member 28 are formed as flat faces parallel to the two-dimensional plane defined by these two directions. Guide members 29 furnished with a guide face 29a parallel to the end faces 28a are fastened to the portions on the inner face of the housing 24 that are in opposition to the end faces 28a. Due to sliding between the guide faces 29a and the end faces 28a, the output section 26 is stably moved over the motion path within the two-dimensional plane.

It should be noted that preferably a predetermined gap G (FIG. 9) is provided between the guide faces 29a and the end faces 28a and an oil as a viscous fluid is held in the gap G, and by doing this, it is possible to give the gap G the function of a so-called oil film damper. This will be discussed later.

As shown in FIG. 3, one lift member 28 is each provided at the front and rear end portions in the carrying direction of the lower face of the output section main member 26a, that is, the output section 26 is guided by two locations in the carrying direction, and thus the output section 26 is reliably kept from moving in the left-right direction.

Also, as shown in FIG. 3 and FIG. 5A, a seal member 27 made of an elastic material such as rubber is provided in the gap between the output section 26 and the opening 24f of the housing 24 over the entire inner circumference of the opening 24f. The seal member 27 is a so-called oil seal that blocks the cam lubricant oil filled into the space within the housing 24 from leaking to the outside. As for the type of the elastic material, because the output section main member 26a moves back and forth in the carrying direction, a material that has the ability to elastically deform by an amount that is greater than this reciprocating movement amount is ideal.

(2-C) First Cam Mechanism

The first cam mechanism 30 shown in FIG. 3 is for creating the carrying direction component motion of the motion path and applies this to the output section 26; that is, it converts the rotational motion of the input shaft 22 into reciprocating linear motion in the carrying direction and transmits this to the output section 26.

The first cam mechanism 30 according to this embodiment is structured using a so-called rib cam. That is, it is provided with a rib cam 32 as a first cam that is constituted by an annular rib 34 formed at the outer circumference of the input shaft 22, and cam followers 36 as first cam followers that are provided in the output section main member 26a and engage with the rib 34.

The configuration of the cam followers 36 is well known, that is, each cam follower 36 is provided with a rotation shaft A and an outer ring R that covers the outer circumference of the rotation shaft A and rotates about the rotation shaft. The rotation shaft A is fastened to a member (output section 26 here) on the follower side of the cam mechanism, but its outer ring R is disposed such that when used it rotatively moves on a cam face of the cam. It should be noted that a cam follower 66 of the second cam mechanism described later has the same structure.

As shown in FIG. 3, there are two cam followers 36 vertically provided side by side to the front and rear in the carrying direction on the lower face 26c of the output section main member 26a, and the two cam followers 36 sandwich the lateral faces 34a and 34b of the rib 34 with their respective outer rings R and rotatively move on the lateral faces 34a and 34b. It should be noted that the lateral faces 34a and 34b are the cam faces.

On the other hand, the position where the rib 34 of the rib cam 32 is formed changes in the carrying direction, which is also the axial direction of the input shaft 22, along the direction of rotation, and the cam curve of the rib cam 32 is expressed by the amount of this change.

Consequently, when the rib cam 32 rotates together with the rotational motion of the input shaft 22, the position of the rib 34 sandwiched by the two cam followers 36 also changes in the carrying direction, thus moving the cam followers 36 in the carrying direction in accordance with this change. In conjunction with this, the output section 26 also is moved forward and rearward in the carrying direction, and thus the carry section 10 fastened to the output section 26 performs reciprocating linear motion in the carrying direction in accordance with the cam curve of the rib cam 32. The cam curve of the rib cam 32 according to this embodiment is set so that the output section 26 performs three cycles of reciprocating movement during one rotation of the input shaft 22, that is, during one rotation of the rib cam 32. Moreover, it is set so that the output section 26 moves forward at the same velocity change as when it moves rearward, although only the moving direction is different.

It should be noted that as shown in FIG. 3, the lateral faces 34a and 34b of the rib 34 are formed as curved faces that are in the vertical direction at a position where the rib 34 comes in contact with the cam followers 36, and the rotation shafts A of the cam followers 36 also are in the vertical direction. Thus, the contact between the rib cam 32 and the cam followers 36 restricts the two from relative movement in the carrying direction but permits relative movement in the vertical direction.

FIG. 6A is a diagram for describing how the first cam mechanism does not impede reciprocating movement of the output section in the vertical direction, and FIG. 6B is a diagram for describing how the second cam mechanism does not impede reciprocating movement of the output section in the carrying direction. As shown by the long-short dashed line in FIG. 6A, the cam followers 36 are capable of relative movement in the vertical direction while maintaining the state of sandwiching the rib 34 of the rib cam 32.

Consequently, when the output section 26 is moved back and forth in the vertical direction, which is the second direction, due to the second cam mechanism 60, which is described later, the cam followers 36 fastened tot he output section 26 also move in the vertical direction, and in this case as well, the cam followers 36 sandwiching the rib cam 32 can slide in the vertical direction with respect to the rib cam 32 and thus do not impede reciprocating movement of the output section 26 in the vertical direction whatsoever. For this reason, the output section 26 can smoothly perform reciprocating linear motion in the vertical direction according to the second cam mechanism 60.

The two cam followers 36 sandwich the rib 34. Consequently, as shown by the long-short dashed line in FIG. 6B, a positional shift in the rib 34 can be reliably transmitted to the output section 26 both forward and rearward during reciprocating movement in the carrying direction. Thus, the vibration as expressed by the cam curve of the rib cam 32 can be applied to the carry section 10 via the output section 26 without being affected whatsoever by "backlash."

(2-D) Second Cam Mechanism

The second cam mechanism 60 shown in FIG. 3 creates the motion that has a vertical direction component of the motion path and applies this motion to the output section 26; that is, it converts the rotational motion of the input shaft 22 into reciprocating linear motion in the vertical direction and transmits this to the output section 26.

Each second cam mechanism 60 is constituted by a so-called face cam. That is, as shown in FIG. 3 and FIG. 5A, it is provided with a disk-shaped face cam 62 as a second cam formed on the input shaft 22, and a cam follower 66 serving as a second follower that is provided on the lift member 28 and that engages with an annular groove 65 formed in one of the plate faces of the face cam 62.

As shown in FIG. 3, a pair of face cams 62 is provided at the front and rear in the carrying direction in correspondence with the pair of front and rear lift members 28. The face cams 62 are provided in the carrying direction such that the front face cam 62 is positioned rearward of the front lift member 28 and the rear face cam 62 is positioned forward of the rear lift member 28. The plate faces of the face cams 62 are in opposition to either the forward side or the rear side end face of the respective lift member 28.

As shown in FIG. 5A, the annular groove 65 is formed about the axis of the input shaft 22 in the plate face of the face cam 62 that is in opposition to the lift member 28. The radial distance from the axis C22 differs depending on the position in the circumferential direction, and the cam curve of the face cam 62 is expressed through this change in radius.

On the other hand, each cam follower 66 is disposed vertically above the axis C22, which is the rotation axis of the face cam 62, in the end face of the respective lift member 28 in opposition to the face cam 62, and that cam follower 66 fits into the annular groove 65 of the face cam 62.

Consequently, when the face cams 62 rotate together with the rotational motion of the input shaft 22, together with this rotation the cam followers 66 rotatively move on the inner circumferential faces 65a of the annular grooves 65, and at this time the cam followers 66 are moved vertically in correspondence with the change in groove position in the radial direction of the annular grooves 65 into which they are fitted. Then, naturally the lift members 28 in which the cam followers 66 are provided and the output section 26 also are moved vertically, and as a result, the carry section 10 fastened to the output section 26 performs reciprocating linear motion in the vertical direction in correspondence with the cam curve of the face cam 62.

In this example, when the face cams 62 rotate together with the rotational motion of the input shaft 22, the position where the two cam followers 66 engages with the respective annular grooves 65 also changes vertically, and thus the cam followers 66 are moved in the vertical direction in correspondence with this change in the position. Together with this the output section 26 also is moved upward and downward in the vertical direction, and thus the carry section 10 fastened to the output section 26 performs reciprocating linear motion in the vertical direction according to the cam curve of the face cam 62. The cam curve of the face cam 62 according to the present embodiment is set so that the output section 26 performs three cycle of reciprocating movement during one rotation of the input shaft 22, that is, during one rotation of the face cams 62. Moreover, it is set so that the output section 26 moves forward at the same velocity change as when it moves rearward, although only the moving direction is different.

It should be noted that as shown in FIG. 3, the inner circumferential faces 65a of the annular grooves 65 are formed as curved faces that are parallel to the carrying direction, and the rotation shafts A of the cam followers 66 also are in the carrying direction. Thus, the face cams 62 and the cam followers 66 restrict relative movement of the other in the vertical direction but permit relative movement in the carrying direction. That is, as shown by the long-short dashed lines in FIG. 6B, the cam followers 66 are capable of relative movement in the carrying direction while remaining fitted into the annular grooves 65 of the face cams 62.

Consequently, when the output section 26 is moved back and forth in the carrying direction, which is the first direction, by the first cam mechanism 30, the cam followers 66, which are fastened to the output section 26 via the lift members 28, also move in the carrying direction, and in this case as well, the cam followers 66 fitted into the annular grooves 65 are capable of sliding in the carrying direction with respect to the annular grooves 65, and thus do not impede reciprocating movement in the carrying direction whatsoever. For this reason, the output section 26 can smoothly perform reciprocating linear motion in the carrying direction according to the first cam mechanism 30.

Moreover, the cam followers 66 are fitted into the annular grooves 65. Consequently, a change in the position of the annular grooves 65 can be reliably transmitted to the output section 26 with regard to reciprocating movement both upward and downward as shown by the long-short dashed line in FIG. 6A. Thus, the vibration as expressed by the cam curve of the face cam 62 can be imparted to the carry section 10 via the output section 26 without being significantly affected by "backlash".

One outcome of the above structure is that the second cam mechanism 60 supports the entire weight of the carry section 10 via the output section 26. Cam mechanisms in general have high rigidity. Consequently, a uniform vibration in the vertical direction can be applied to the entire carry face 12a by the rigid second cam mechanism 60 without having to adopt an unstable support structure such as one in which the carry section 10 is supported by an elastic member having low rigidity, such as the plate spring mentioned above, and as a result, carrying nonuniformities can be effectively inhibited. Further, the second cam mechanism 60 supports the output section 26 at two locations at the front and rear in the carrying direction, and this, too, increases the support stability and allows an even greater effect of inhibiting carrying nonuniformities to be achieved.

(2-E) Balancer

The balancer 70 shown in FIG. 3 inhibits vibration of the housing 24 caused by the motion for carrying the article W, by giving the housing 24 a force that acts in the opposite direction from the force that acts on the housing 24 due to the inertial force that is caused by reciprocating linear motion of the carry section 10 in the carrying direction. The balancer 70 has a right weight 721 and a left weight 722 that are provided respectively to the right and the left of the input shaft 22, rotation shafts 74 serving as the rotation axes of the respective weights 72, first gears formed coaxially with the respective rotation shafts 74, and a second gear that meshes with the first gears and that is provided along the outer circumference of the input shaft 22.

Each weight 72 is a substantially semicircular weight plate whose mass is set to a predetermined mass, and a hole 72b into which the rotation shaft 74 is inserted is provided at the center of a virtual circle that can be formed virtually by extending the perimeter of the semicircular shape. Thus, the center of the weight 72, which defines the substantially semicircular shape, has a portion 72a that protrudes to the opposite side of the arc side thereof so that the hole can be formed. The weight 72 is set so that when the two weights 721 and 722 perform rotational motion and are positioned on the opposite side from the carry section 10 in the horizontal direction, the inertial force due to the carry section 10 is substantially equal to the centrifugal force due to the weights 72. A method for setting the weight 72 is discussed later.

The rotation shafts 74 are horizontally projected from the inner face of the respective lateral wall of the housing 24 in the left-right direction toward the inside of the housing 24, and disposed such that the axes of the two rotation shafts 74 and the axis of the input shaft 22 are within the same horizontal plane. Moreover, on the front end side of each rotation shaft 74, that is, on the inner side of each weight 72, a first bevel gear 78 serving as the first gear that decreases in diameter toward the inside is provided around the axis of the rotation shaft 74.

A second bevel gear 76 serving as the second gear that meshes with the first bevel gears 78 is provided on the input shaft 22 so that it decreases in diameter rearwardly. The number of teeth of the second bevel gear 76 is set to an integral multiple of that of the first bevel gear 78. In the example of this embodiment, the number of teeth of the second bevel gear 76 is set to be three times as large as that of the first bevel gear 78. Thus, it is set so that during one rotation of the input shaft 22, the second bevel gear 76 makes one rotation, while the first bevel gears 78 make three rotations. That is, it is set so that during one rotation of the input shaft 22, the output section 26 performs three cycles of reciprocating movement, and the weights 72 make three rotations. Further, it is set so that the output section 26 and the weights 72 are moved in antiphase, and the cycle of the reciprocating linear motion of the output section 26 matches with the cycle of the rotational motion of the weights 72.

Moreover, since the first bevel gears 78 provided for the right and left weights 721 and 722 mesh with the second bevel gear 76 while they are on opposite sides with the input shaft interposed therebetween, the right and left weights 721 and 722 rotate in opposite directions to each other. The two weights 721 and 722 respectively provided on the right and left sides are set so that when their centers of gravity and the axes of the rotation shafts 74 are aligned in the horizontal direction, the weights are positioned on the same side with respect to the rotation shafts in the carrying direction, whereas when the centers of gravity of the weights and the axes of the rotation shafts 74 are aligned in the vertical direction, the weights are positioned on opposite sides in the vertical direction with the rotation shafts interposed therebetween. Further, the two weights 721 and 722 respectively provided on the right and left sides are set so that they move in the opposite direction from the reciprocating motion of the output section 26 in the carrying direction. That is, when the output section 26 moves forward, the weights 721 and 722 move rearward, and when the output section 26 moves rearward, the weights 721 and 722 move forward. Accordingly., when the output section 26 is in its forefront position, the weights 721 and 722 are in their rearmost position, and when the output section 26 is in its rearmost position, the weights 721 and 722 are in their forefront position.

<Method for Setting the Mass of the Weights>

In this embodiment, as described above, the two weights 721 and 722 are set so that when the two weights 721 and 722 perform rotational motion and are positioned on the opposite side of the carry section 10 in the horizontal direction, the inertial force due to the carry section 10 is substantially equal to the centrifugal force due to the weights 721 and 722. Although two weights 721 and 722 are used in the embodiment, when setting them, a consideration is made assuming that a single weight 72 is used, and half the obtained mass is used as the mass of each of the weights 721 and 722.

Figure 7:
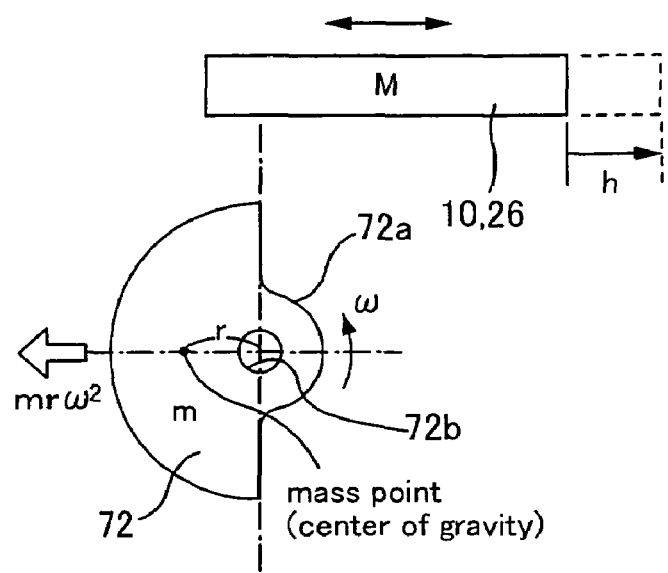
FIG. 7 is a model diagram for describing a weight setting method.

FIG. 7 is a model diagram for describing a method for setting the weight 72. As shown in the drawing, the mass of the output section 26 and the carry section 10 is taken as M (kg), a stroke of the carry section 10 in the carrying direction is taken as h (m), the mass of the weight 72 is taken as m (kg), the distance from the rotation axis of the weight 72 to the center of gravity thereof is taken as r (m), and the rotational angular velocity of the weight 72 is taken as ω (rad/s). In addition to these, a is used as the maximum acceleration (m/s$^2$) of the output section 26 and the carry section 10, th is used as the moving time (s) of a single stroke, Am is used as the maximum dimensionless acceleration, and N (rpm) is used as the number of rotations of the weight. Here, the maximum dimensionless acceleration Am, which is determined for each cam curve, has already been obtained based on the cam curve. Moreover, the maximum acceleration a (m/s$^2$), which represents the maximum acceleration (m/s$^2$) of the output section 26 and the carry section 10, is expressed by Formula 1 below using the maximum dimensionless acceleration Am:

$$a = (h \cdot th^2) \cdot Am \quad \text{Formula 1}$$

The inertial force I due to the output section 26 and the carry section 10 and the centrifugal force F due to the weight 72 can be obtained independently using Formula 2 and Formula 3 below:

$$I = M \cdot a \quad \text{Formula 2}$$

$$F = 2m \cdot r \cdot \omega^2 \quad \text{Formula 3}$$

Thus, the weight is set so that the inertial force I is equal to the centrifugal force F. That is, the weight is set so that Formula 4 below is obtained:

$$2m \cdot r \cdot \omega^2 = M \cdot a$$

$$m \cdot r = [(M \cdot Am/2)\{h/(th^2 \cdot \omega^2)\}] \quad \text{Formula 4}$$

Here, with the substitution th=(½)(60/N) and ω=(N/60)2π in Formula 4, Formula 5 below is obtained:

$$m \cdot r = (M \cdot Am \cdot h)/(2\pi^2) \quad \text{Formula 5}$$

In Formula 5, "m" and "r" are variables, and "M", "AM", and "h" are constants. For this reason, by setting "m" and "r" so that Formula 5 is satisfied, the inertial force due to the carry section 10 can be made substantially equal to the centrifugal force due to the weight 72.

(2-E) Oil Film Damper

The oil filter damper is a damper that utilizes the viscosity of oil, which functions as a viscous fluid; that is, it attenuates the relative movement of two objects that oppose one another via an oil film using the shearing force of the oil film as a damping force.

Figure 8:
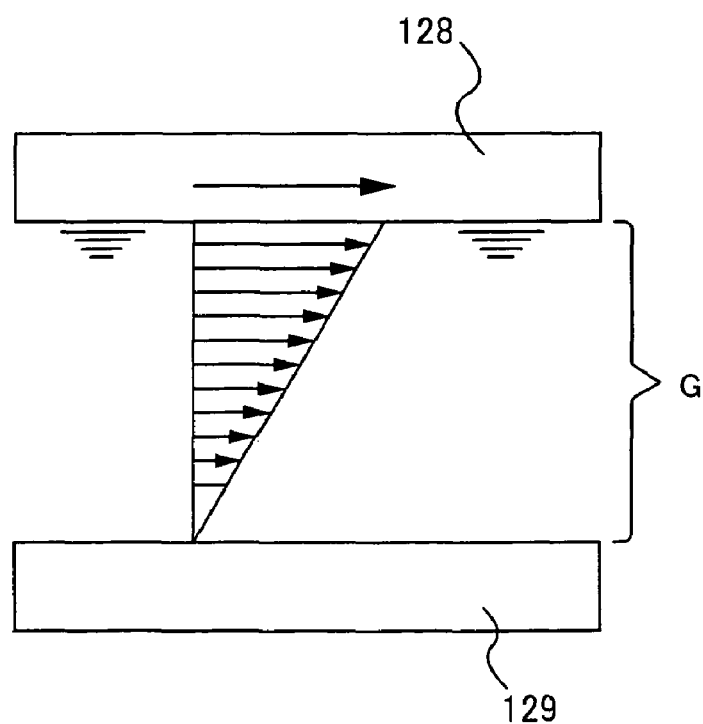
FIG. 8 is a conceptual diagram for describing an oil film damper.
Figure 9:
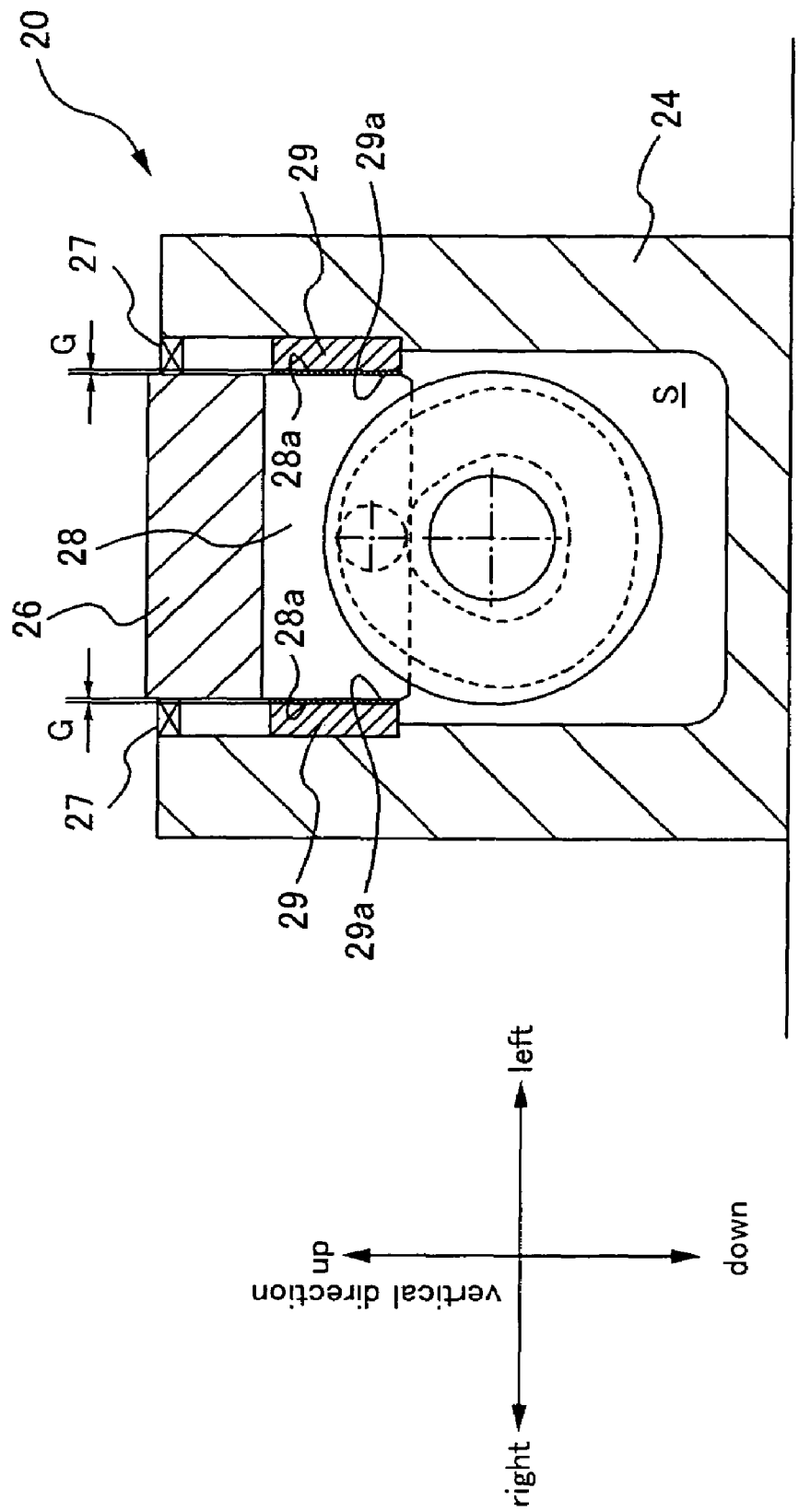
FIG. 9 is a vertical sectional view taken in the arrow direction along the line V—V in FIG. 3, for describing the oil film damper.

FIG. 8 is a model diagram for describing an oil film damper, and FIG. 9 is a vertical sectional view taken in the arrow direction along the line V—V in FIG. 3, for describing a configuration of an oil film damper according to the present embodiment. As shown in the drawing, for example, two parallel flat plates 128 and 129 arranged so that their flat faces oppose one another with a predetermined gap G provided therebetween are described. When a viscous fluid is held in the predetermined gap G between the two parallel flat plates 128 and 129 and one parallel flat plate 128 is moved relative to the other, then a velocity gradient such as that shown by arrows in the drawing occurs in the viscous fluid, and this causes a force in the opposite direction of the relative movement to act on the parallel flat plate 128. This force becomes a damping force that attenuates that relative movement.

Here, in this embodiment, a cam lubricant oil is filled into the internal space S of the housing 24 as mentioned above (see FIG. 4). Thus, as shown in FIG. 9, if a predetermined gap G is provided between the guide face 29a of the guide member 29 of the housing 24 and the end face 28a of the lift member 28 in opposition to that guide face 29a, then the gap G when filled with the lubricating oil functions as an oil film damper.

This oil film damper allows the deleterious vibration of the carry section itself that occurs for structural reasons due to, for example, bending deformation of the carry section 10 to be damped by the viscous resistance of the oil film. As a result, the planned vibration based on the cam mechanisms 30 and 60 can be applied to the carry section 10.

It should be noted that the gap G can be set from 0.005 mm to 0.05 mm. This is because setting the gap G to at least 0.005 mm allows physical contact between the guide face 29a and the end face 28a to be reliably prevented, and the oil film between these effectively exhibits a damping action with respect to the deleterious vibration. On the other hand, if the gap G is not more than 0.05 mm, then shaking of the carry section 10 can be kept small.

Figure 10:
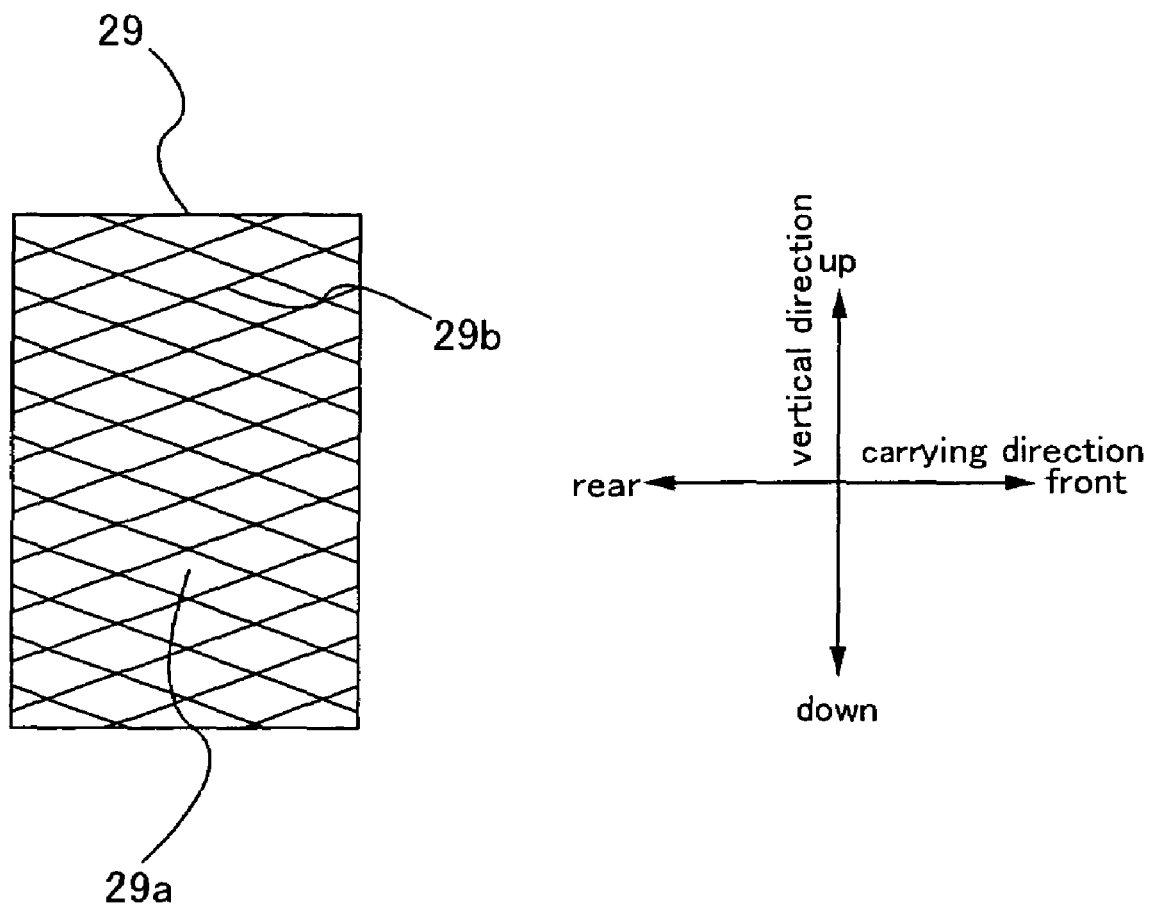
FIG. 10 shows an example of the formation pattern of grooves formed in a guide face.

Further, it is preferable that multiple grooves are formed in at least one of either the groove faces 29a or the end faces 28a, because this leads to favorable holding of the viscous fluid in the gap by the grooves and allows an oil film damper to be reliably formed in the gap. FIG. 10 shows an example of the formation pattern of the grooves formed in a guide face. In this example, the grooves 29b are formed in a diamond-shaped lattice in the guide face 29a, as shown in the drawing.

(3) Motion Path of the Carry Section and Operation of the Balancer According to the Embodiment Here, the operation of the carry section 10 and the balancer 70 according to this embodiment is described. It should be noted that the operation of the carry section 10 described here is realized based on an example of the motion path that is achieved according to the setting of the cam curves of the first cam and the second cam. Consequently, the operation of the carry section 10 is not limited whatsoever to this motion path, and depending on the setting of the cam curves, a motion path that corresponds to required parameters, such as the carrying capacity, can also be achieved, and the motion path of the balancer 70 can be set in correspondence with the motion path of the carry section 10.

Figure 11:
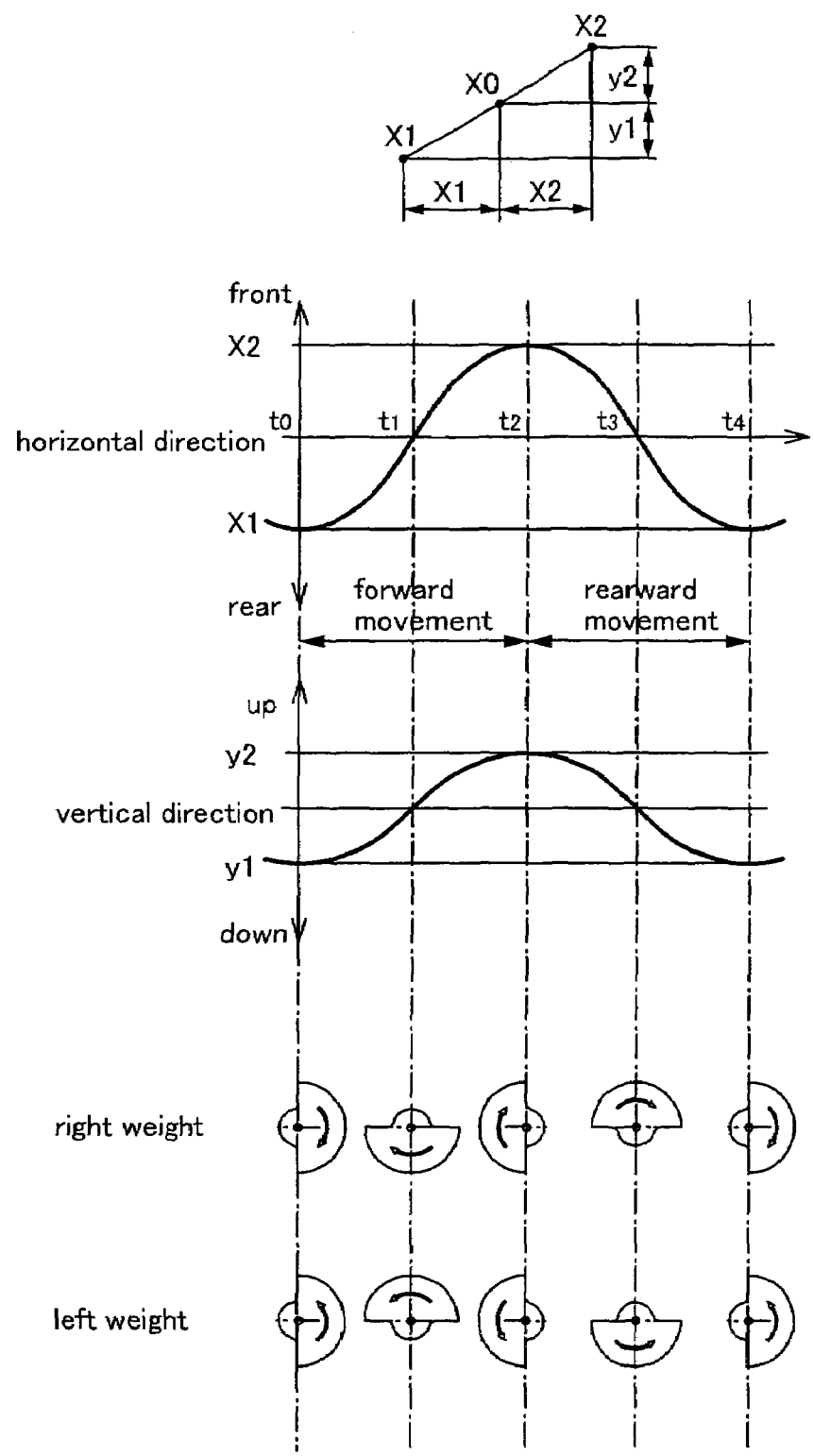
FIG. 11 is a diagram for describing an example of a motion path applied to the carry section by a vibration applying mechanism as well as the operation of a balancer.

FIG. 11 is a diagram for describing an example of the motion path applied to the carry section 10 by the vibration applying mechanism 20 and the operation of the balancer 70. The uppermost stage of FIG. 11 is a timing chart of horizontal movement, which is the reciprocating linear motion in the carrying direction; the second stage from the top is a timing chart of vertical movement, which is the reciprocating linear motion in the vertical direction; the third stage from the top shows the phase of the right weight 721; and the bottom stage shows the phase of the left weight 722. The example of FIG. 11 shows the timing chart of the carry section 10 and the phases of the weights during a period of time in which the carry section 10 performs a single cycle of reciprocating movement in the carrying direction. Thus, FIG. 11 shows the timing chart of the carry section 10 and the phases of the weights 721 and 722 during a period of time in which the input shaft 22, that is, the rib cam 32 and the face cams 62, makes ⅓ rotations and the right and left weights 721 and 722 make one rotation. The timing chart of the uppermost stage shows the horizontal movement position change of the carry section 10 versus time, the timing chart of the second stage from the top shows the vertical movement position change versus time, and the lower two stages show the rotational position of the two weights 72 at predetermined times. It should be noted that the four stage figures share an identical time axis.

In this example, the description is made under the assumption that when the rotational motion is input to the input shaft 22 and the rib cam 32 and the face cams 62 are rotated as a result, the center of gravity of the carry section 10 in a single unit with the output section 26 is caused to move reciprocally between X1(x1, y1) and X2(x2, y2). Moreover, the operation in which the carry section 10 performs a single reciprocating movement between X1 and X2 while the input shaft 22 is rotating continuously, is described here. That is, a time point t0 shown in FIG. 11 represents a certain moment during continuous rotation of the input shaft 22, rather than representing a state in which the linear feeder 1 is stopped. The carry section 10 at the time point t0 is in the position X1 located at the rearmost of a region over which the carry section 10 can move reciprocally in the carrying direction and at the lowermost of a region over which the carry section 10 can move reciprocally in the vertical direction. Moreover, regarding to the weight 72, the centers of gravity of the two weights 721 and 722 are positioned horizontally with the axes of the rotation shafts 74 and forward of the axes of the rotation shafts 74 in the carrying direction.

At the time point to when the input shaft 22 is rotating, the carry section 10 starts to move forward in the carrying direction and upward in the vertical direction. At this time, the right weight 721 rotates clockwise, whereas the left weight 722 rotates counterclockwise.

At a time point t1, the carry section 10 arrives at a position X0 halfway through the region over which it can move reciprocally in the carrying direction, and in the vertical direction, too, it arrives at a position halfway through the region over which it can move reciprocally. At this time, the right weight 721 is in a position where its center of gravity is below the axis of the rotation shaft 74 in the vertical direction, and the left weight 722 is in a position where its center of gravity is above the axis of the rotation shaft 74 in the vertical direction.

When the input shaft 22 further rotates, the carry section 10 arrives, at a time point t2, at the position X2 located at the forefront of the region over which it can move reciprocally in the carrying direction and at the uppermost of the region over which it can move reciprocally in the vertical direction. At this time, the right weight 721 rotates clockwise to arrive at a position where its center of gravity is positioned rearward of the axis of the rotation shaft 74 in the carrying direction and horizontally with the axis of the rotation shaft 74, and the left weight 722 rotates counterclockwise to arrive at a position where its center of gravity is positioned rearward of the axis of the rotation shaft 74 and horizontally with the axis of the rotation shaft 74. That is, at the time point t2 when the carry section 10 arrives at the position X2 located at the forefront of the region over which it can move reciprocally in the carrying direction, the two weights 721 and 722 move to the position where their centers of gravity are positioned rearward of the axes of the rotation shafts 74 in the carrying direction and horizontally with the axes of the rotation shafts 74, while rotating in opposite directions to each other. Consequently, when the carry section 10 is in the position X2 located at the forefront of the region over which it can move reciprocally in the carrying direction, the centers of gravity of the two weights 721 and 722 are on the opposite side of the carry section 10 with the rotation shafts 74 interposed therebetween. Then, the carry section 10 moves rearward toward X1, and the weights 721 and 722 continue to rotate.

After that, at a time point t3, the carry section 10 arrives at the position halfway through the region over which it can move reciprocally in the carrying direction, and in the vertical direction, too, it arrives at the position XO halfway through the region over which it can move reciprocally. At this time, the right weight 721 is in a position where its center of gravity is above the axis of the rotation shaft 74 in the vertical direction, and the left weight 722 is in a position where its center of gravity is below the axis of the rotation shaft 74 in the vertical direction.

Then, at a time point t4 when the input shaft 22 completes ⅓ rotations, the carry section 10 returns to the position X1 located at the rearmost of the region over which it can move reciprocally in the carrying direction and at the lowermost of the region over which the carry section 10 can move reciprocally in the vertical direction. Moreover, the right weight 721 rotates clockwise to arrive at the position where its center of gravity is positioned forward of the axis of the rotation shaft 74 in the carrying direction and horizontally with the axis of the rotation shaft 74, and the left weight 722 rotates counterclockwise to arrive at the position where its center of gravity is positioned forward of the axis of the rotation shaft 74 in the carrying direction and horizontally with the axis of the rotation shaft 74. That is, at the time point t4 when the carry section 10 arrives at the position X1 located at the rearmost of the region over which it can move reciprocally in the carrying direction, the two weights 721 and 722 move to the position where their centers of gravity are positioned forward of the axes of the rotation shafts 74 in the carrying direction and horizontally with the axes of the rotation shafts 74, while rotating in opposite directions to each other. That is, the centers of gravity of the two weights 721 and 722 are positioned horizontally with the axes of the rotation shafts 74 and forward of the axes of the rotation shafts 74 in the carrying direction.

===Forces Acting on the Housing Due to the Cam Mechanisms and the Balancer===

Next, by means of FIG. 11 and FIG. 12, forces that act on the housing due to the cam mechanisms and the balancer are described for each of the time points t0 to t4. FIG. 12 is a diagram for describing the centrifugal force that occurs due to rotational motion of the two weights.

At the time point t0, the motion of the carry section 10 that was moving rearward in the carrying direction changes to the forward motion. Thus, acceleration in the carrying direction applied to the carry section 10 is at its maximum, and the inertial force that acts rearward is greatest. On the other hand, in the vertical direction, the motion of the carry section 10 that was moving downward in the vertical direction changes to the upward motion. Thus, acceleration in the vertical direction applied to the carry section 10 is at its maximum, and the inertial force that acts downward is greatest. That is, the friction between the article W and the carry section 10 increases, and the article W moves together with the carry section 10, rather than sliding over the upper face 12*a* of the carry section 10. Moreover, although rotating in different directions, the two weights 721 and 722 at the time point t0 are in the state where the centers of gravity of the weights 721 and 722 are positioned horizontally with the axes of the rotation shafts 74 and forward of the axes of the rotation shafts 74 in the carrying direction, so that the centrifugal force toward the front in the carrying direction is greatest with respect to both the weights 721 and 722, as shown in FIG. 12. At this time, the rotational motion of the two weights 721 and 722 does not generate a force in the vertical direction.

At the time point t1, the carry section 10 is in the position halfway through the region over which it can move in the carrying direction, and the velocity at which it moves forward is at its maximum, so that acceleration is "0". Thus, the inertial force that is applied to the carry section 10 and that acts in the carrying direction is "0". Moreover, in the vertical direction, since the carry section 10 is being raised, that is, it is in the position halfway through the distance over which the carry section 10 can move, the velocity at which it moves upward is at its maximum and acceleration is "0", so that the inertial force in the vertical direction is "0". Moreover, the right weight 721 is in a position where its center of gravity is directly below the axis of the rotation shaft 74 in the vertical direction. Thus, the centrifugal force that acts downward in the vertical direction is greatest. On the other hand, the left weight 722 is in a position where its center of gravity is directly above the axis of the rotation shaft 74 in the vertical direction. Thus, the centrifugal force that acts upward in the vertical direction is greatest. In this embodiment, the two weights 721 and 722 have the same mass and their centers of gravity also are set to the same position, and therefore, the centrifugal forces that occur due to the rotational motion of the weights 721 and 722 cancel each other as shown in FIG. 12.

At the time point t2, the motion of the carry section 10 that was moving forward in the carrying direction changes to the rearward motion. Thus, acceleration in the carrying direction applied to the carry section 10 is at its maximum, and the inertial force that acts in the forward direction is greatest. On the other hand, in the vertical direction, the motion of the carry section 10 that was moving upward in the vertical direction changes to the downward motion. Thus, acceleration in the vertical direction applied to the carry section 10 is at its maximum, and the inertial force that acts in the upward direction is greatest. Moreover, although rotating in different directions, the two weights 721 and 722 at the time point t2 are in the state where the centers of gravity of the weights 721 and 722 are positioned horizontally with the axes of the rotation shafts 74 and rearward of the axes of the rotation shafts 74 in the carrying direction, so that the centrifugal force that acts rearward in the carrying direction is greatest with respect to both of the weights as shown in FIG. 12. At this time, the rotational motion of the two weights 721 and 722 does not generate a force in the vertical direction.

At the time point t3, the carry section 10 is in the position halfway through the region over which it can move in the carrying direction, and the velocity at which it moves rearward is greatest, so that acceleration is "0". Thus, the inertial force that is applied to the carry section 10 and that acts in the carrying direction is "0". Moreover, in the vertical direction, since the carry section 10 is being lowered, that is, it is in the position halfway through the distance over which the carry section 10 can move, the velocity at which it moves downward is greatest and acceleration is "0", so that the inertial force in the vertical direction is "0". Moreover, the center of gravity of the right weight 721 is directly above the axis of the rotation shaft 74 in the vertical direction. Thus, the centrifugal force that acts upward in the vertical direction is greatest. On the other hand, the center of gravity of the left weight 722 is directly below the axis of the rotation shaft 74 in the vertical direction. Thus, the centrifugal force that acts downward in the vertical direction is greatest. In this embodiment, the two weights 721 and 722 have the same mass and their centers of gravity are also set to the same position, and therefore, the centrifugal forces that occur due to the rotational motion of the weights 721 and 722 cancel each other as shown in FIG. 12.

At the time point t4, the carry section 10 returns to the position X1, and the right and left weights 721 and 722 also complete one rotation and return to their original position. That is, they have returned to the same state as at the time point t0.

Then, the inertial force that occurs due to reciprocating motion of the carry section 10 is transmitted to the housing 24 via the cam followers 36, the rib cam 32 and the input shaft 22, and the bearings 23. On the other hand, the centrifugal force that occurs due to rotational motion of the two weights 721 and 722 is transmitted to the housing 24 via the rotation shafts 74. Accordingly, the resultant force of the inertial force due to reciprocating linear motion of the carry section 10 and the centrifugal force due to rotational motion of the weights 721 and 722 acts on the housing 24.

Figure 13:
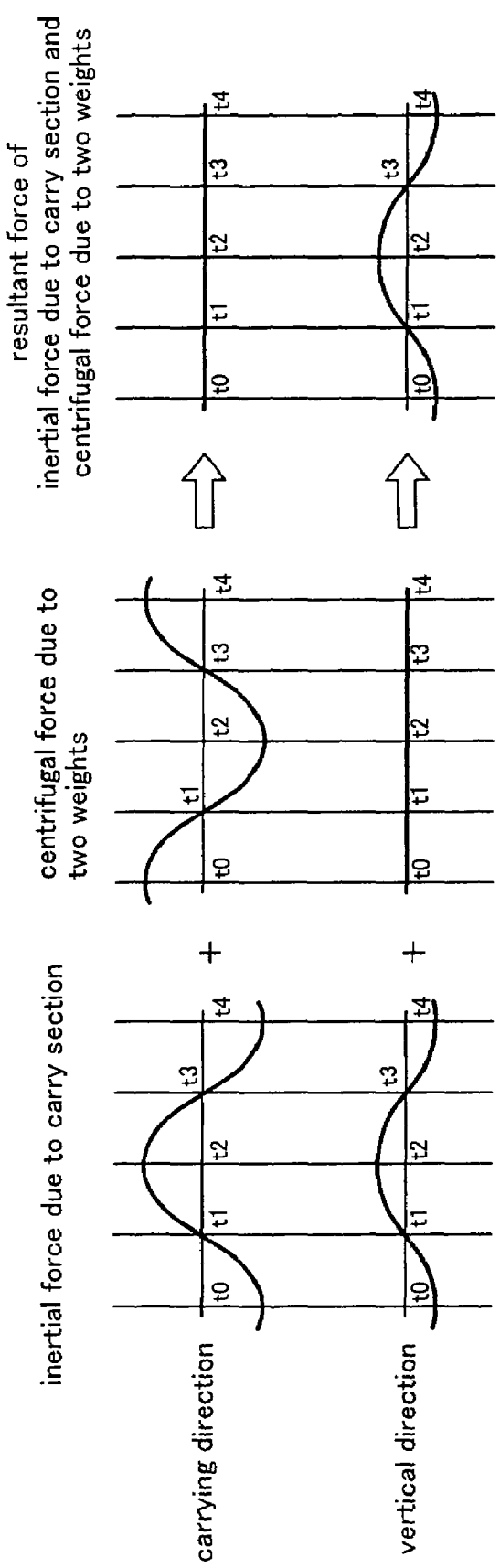
FIG. 13 is a diagram for describing a force that acts on a housing.

FIG. 13 is a diagram for describing forces that act on the housing. As shown in FIG. 13, in the carrying direction, the inertial force due to reciprocating linear motion of the carry section 10 and the centrifugal force due to rotational motion of the weights 721 and 722 act in antiphase. Since the mass and the center of gravity of the two weights 721 and 722 are set so that the inertial force in the carrying direction that occurs due to reciprocating motion of the carry section 10 is equal to the centrifugal force in the carrying direction due to rotational motion of the two weights 721 and 722, the inertial force due to the carry section 10 and the centrifugal force due to the weights 721 and 722, which act in antiphase, cancel each other, and as a result a force that acts on the housing 24 in the carrying direction does not occur.

On the other hand, in the vertical direction, the centrifugal forces due to rotational motion of the respective two weights 721 and 722 cancel each other, so that the centrifugal force due to rotational motion of the two weights 721 and 722 hardly acts on the housing 24. Consequently, the inertial force in the vertical direction that occurs due to reciprocating motion of the carry section 10 acts almost directly without being cancelled.

With the linear feeder 1 according to this embodiment, during carrying of the article W, the force that acts on the housing 24 due to application of vibration to the carry section 10 can be inhibited by the balancer 70. That is, since the force that acts on the housing 24 when vibration is applied to the carry section 10 is reduced, the housing 24 is less prone to vibration. Thus, vibration of the linear feeder 1 itself can be suppressed, and the article W can be carried properly, and further, generation of noise due to vibration also can be inhibited.

Moreover, since the weights 721 and 722 are rotated about the respective rotation shafts 74 each provided at a different position from the center of gravity of the weight, the centrifugal force that acts in a predetermined direction can be generated easily by rotating the weights 721 and 722. Since the rotation shafts 74 are orthogonal to the carrying direction, when the weights 721 and 722 are rotated, the centers of gravity of the weights 721 and 722 are moved in the direction opposite from the direction of reciprocating linear motion of the carry section, and it is possible to cause the centrifugal force that occurs at this time to act so as to cancel the inertial force that occurs due to reciprocating linear motion of the carry section 10. Thus, the force that acts on the housing 24 due to application of vibration to the carry section 10 can be inhibited reliably. In particular, since the rotation shafts 74 according to this embodiment are provided along the horizontal direction, the centrifugal force that occurs when the weights 721 and 722 are rotated acts in the vertical direction and the carrying direction. Thus, the centrifugal force does not act in the horizontal direction that is orthogonal to the carrying direction and that causes the article to be carried along a winding path, so that the article can be carried more accurately. In this embodiment, the example in which the rotation shafts 74 of the weights 721 and 722 are provided along the horizontal direction has been described. However, if the rotation shafts 74 are provided in a direction, such as the vertical direction, that is orthogonal to the carrying direction, then it is possible to cause the centrifugal force that occurs due to rotation of the weights 721 and 722 to act so as to cancel the inertial force that occurs due to reciprocating linear motion of the carry section 10. However, the rotation shafts 74 are more preferably provided along the horizontal direction, because the centrifugal force does not act in directions other than the direction in which it acts so as to cancel the inertial force that acts on the housing 24 during carrying of the article, as described above.

In particular, since the respective masses of the two weights 721 and 722 are set to be equal, the magnitude of the centrifugal forces respectively generated by the two weights 721 and 722 can be made equal with ease. Thus, when the two weights 721 and 722 are positioned such that the centers of gravity of the weights 721 and 722 are positioned in alignment with the rotation shafts 74 in the carrying direction, the centers of gravity of the two weights 721 and 722 are positioned on the same side with respect to the rotation shafts 74, and therefore the centrifugal forces generated by rotating the two weights 721 and 722 act in the same direction. This allows the centrifugal forces generated by rotating the two weights 721 and 722 to act efficiently in the opposite direction of the moving direction of the carry section 10 in the carrying direction. Moreover, when the two weights 721 and 722 are positioned such that their centers of gravity are positioned in alignment with the rotation shafts 74 in the vertical direction, the centers of gravity of the two weights 721 and 722 are on opposite sides with the rotation shafts 74 interposed therebetween, and therefore the centrifugal forces generated by rotating the two weights 721 and 722 act in opposite directions in the vertical direction. That is, the centrifugal forces generated by the two weights 72.1 and 722 act so as to cancel each other. Thus, the force that occurs due to rotation of the two weights 721 and 722 and that acts in the vertical direction can be kept small. Since the two weights 721 and 722 are rotated in opposite directions to each other, a balancer 70 that acts efficiently in the horizontal direction and that does not generate any unnecessary force in the vertical direction can be achieved by shifting the phase of each weight by 180° with respect to the other.

Further, the two weights 721 and 722 are each provided with the first bevel gear 78 that rotates around the rotation shaft 74, and each first bevel gear 78 engages with the second bevel gear 76 provided on the input shaft 22 for supplying an input to the first and second cam mechanisms 30 and 60, so that the balancer 70 can be operated by rotating the input shaft 22 for inputting a driving force to the first cam mechanism 30 for causing the carry section 10 to perform reciprocating linear motion. That is, it is not necessary to provide a power source for operating the balancer 70 and an input section for the motive power, and the balancer 70 can be operated with a simple configuration. In particular, in the linear feeder 1 according to this embodiment, it is necessary to match the phase of reciprocating linear motion of the carry section 10 with that of rotational motion of the balancer 70; because the balancer 70 is driven by the input shaft 22 of the first cam mechanism 30 that drives the carry section 10, the phase of reciprocating linear motion of the carry section 10 can be matched with that of rotational motion of the balancer 70 easily and appropriately. Thus, it is possible to inhibit the force that acts on the housing 24 more efficiently to prevent the vibration. Further, in the linear feeder 1 according to this embodiment, the two weights 721 and 722 that rotate in opposite directions to each other are arranged so that the input shaft 22 is interposed between them, and thus the two weights 721 and 722 are on opposite sides with the input shaft 22 interposed therebetween. That is, the first bevel gears 78, which the two weights 721 and 722 respectively have, engage with the second bevel gear 76, which the input shaft 22 has, in such a manner that they are rotated in opposite directions to each other. Thus, the two weights 721 and 722 can be rotated in opposite directions easily.

In the above-described embodiment, the example in which the respective masses of the two weights 721 and 722 are set to be equal was used. However, the force that acts on the housing 24 in the vertical direction can be inhibited by setting the respective masses of the two weights 721 and 722 to be different from each other. For example, by setting the mass of the right weight 721 to be greater than that of the left weight 722, the magnitude of the centrifugal force that occurs due to rotation of the right weight 721 can be made greater than the centrifugal force that occurs due to rotation of the left weight 722. Thus, when the right weight 721 and the left weight 722 are positioned on opposite sides with the rotation shafts 74 interposed therebetween, it is possible to cause a centrifugal force corresponding to the difference between the centrifugal force that occurs due to rotation of the right weight 721 and the centrifugal force that occurs due to rotation of the left weight 722, to act on the housing 24. That is, even when the two weights 721 and 722 are positioned on opposite sides with the rotation shafts 74 interposed therebetween, the force that acts on the housing 24 can be inhibited. At this time, there will be a difference in the centrifugal forces in the carrying direction as well. However, the centrifugal forces due to the two weights 721 and 722 act in the same direction in the carrying direction, so that in the carrying direction, the inertial force that occurs due to reciprocating linear motion of the carry section 10 can be cancelled substantially as well as in the case where the two weights 721 and 722 have the same mass. In this case, it is preferable to let the two weights 721 and 722 have different masses appropriately by distributing the mass needed to cancel the inertial force that occurs due to reciprocating linear motion of the carry section 10.

Moreover, in the above-described embodiment, the example in which one weight each is provided on the right and left sides was used. However, a plurality of weights may be provided on both the right and left sides. For example, it is also possible that a weight is formed as a plate, and a plurality of the weight plates are stacked into a weight group, which is used as a single weight, and rotated by the right or left rotation shaft 74. In this case, by changing the number of weight plates to be stacked, the total mass of the weight group can be changed, and thus the centrifugal force to be generated can be changed. For this reason, for example, even when the mass of the carry section is changed by replacing the carry section or when the mass of the article to be carried varies considerably, the force that acts on the housing can be inhibited easily by changing the number of weight plates.

Further, when the masses of the right and left weights are to be made different from each other to inhibit vibration in the vertical direction, a first weight group and a second weight group, which have different total masses, can easily be set as weight groups each having a suitable mass as the balancer by setting the numbers of weight plates differently between the right and left.

In the above-described embodiment, an example in which the output section 26 is moved by the cam mechanisms in both the carrying direction and the vertical direction was used. However, with a linear feeder in which the output section is made to perform reciprocating linear motion by a cam mechanism at least in the carrying direction, the force that acts on the housing 24 can be inhibited efficiently by matching the phase of the output section due to the cam and the phase of the weights of the balancer.

Moreover, in the above-described embodiment, the number of rotations of the rotation shafts 74 was three times greater than that of the input shaft 22. However, this is not a limitation, and it is sufficient that the number of rotations of the rotation shafts 74 is an integral multiple of that of the input shaft 22. At this time, the ratio of the number of rotations of the rotation shafts 74 to that of the input shaft 22 can be determined easily by the numbers of teeth of the first bevel gear and the second bevel gear.

Figure 14:
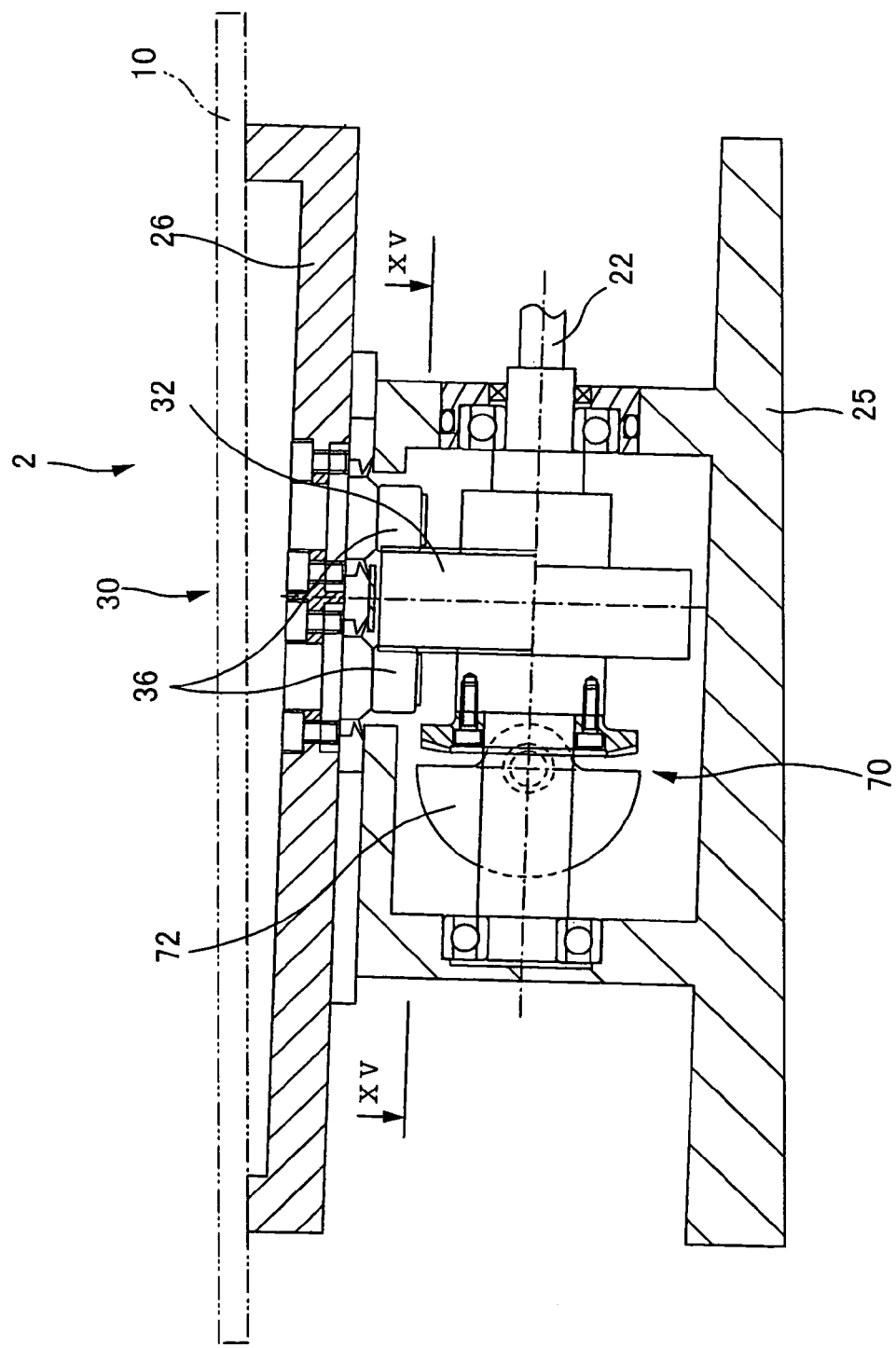
FIG. 14 is a front cross-sectional view showing another example in which the balancer is applied to a linear feeder in which the output section is moved by a cam mechanism only in the carrying direction.
Figure 15:
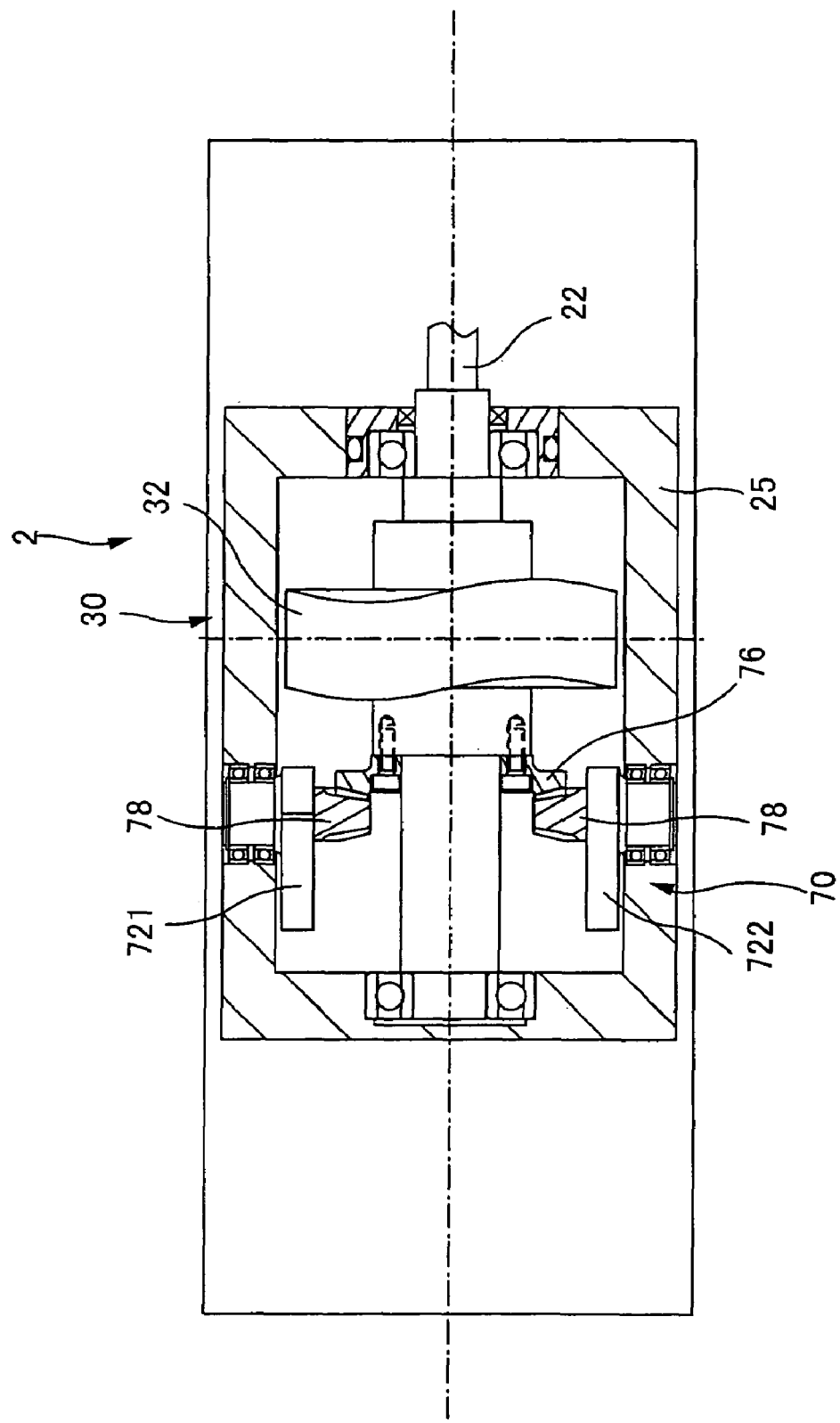
FIG. 15 is a cross-sectional view taken along the line XV—XV in FIG. 14.

FIG. 14 is a front cross-sectional view showing another example in which the balancer is applied to a linear feeder in which the output section is moved by the cam mechanism only in the carrying direction, and FIG. 15 is a cross-sectional view taken along the line XV—XV in FIG. 14. In FIG. 14 and FIG. 15, the same components as those in the above-described embodiment are assigned the same reference numerals.

As shown in the drawings, a linear feeder 2 of this example is different from the linear feeder 1 according to the above-described embodiment in terms of the mechanism for moving the output section 26 in the vertical direction. That is, in the example discussed above, movement of the output section 26 in the vertical direction was also achieved by the cam mechanism, whereas in this example, by providing the first cam mechanism 30 at a tilt, the output section 26 is moved in an oblique direction, thereby allowing a force to act in the vertical direction.

Even with the linear feeder 2 of this configuration, in the carrying direction, the force that acts on a housing 25 due to application of vibration to the carry section 10 can be inhibited reliably by causing the centrifugal force that occurs due to rotational motion of the balancer 70 to act in the opposite direction of the direction of the inertial force that occurs due to reciprocating linear motion of the output section 26 and the carry section 10.

===Other Embodiments===

Embodiments of the present invention were described above, but the present invention is not limited to these embodiments, and modifications such as the following also are possible.

In the embodiments of the present invention, only a single first cam mechanism 30 was provided in a substantially central portion in the carrying direction, but the number provided and the location(s) provided are not limited to this, and it is also possible to provide a plurality of first cam mechanisms 30, or to provide the first cam mechanism 30 at an end portion in the carrying direction. However, when only a single first cam mechanism 30 is provided, then from the perspective of front/rear symmetry in the carrying direction, it is preferably provided at a substantially central portion as shown in FIG. 3.

In the embodiments of the present invention, two second cam mechanisms 60 are respectively provided at the end portions at the front and the rear in the carrying direction, but the number provided and the location(s) provided are not limited to this, and it is also possible to provide a single or three or more second cam mechanisms 60, and the second cam mechanism(s) 60 can also be provided in a substantially central portion in the carrying direction. However, from the standpoint of stability in supporting the output section 26, it is preferable that at least two are furnished to provide multiple point support at two or more points, and it is preferable that they are disposed as far apart as possible.

Although the preferred embodiments of the present invention have been described in detail, it should be understood that various changes, substitutions and alterations can be made therein without departing from spirit and scope of the inventions as defined by the appended claims.

What is claimed is:

1. An article carrying apparatus comprising:
   a carry section for linearly restricting a carrying direction of an article to be carried;
   a cam mechanism for applying a vibration to said carry section by transmitting, to said carry section, a reciprocating linear motion having at least a carrying direction component in said carrying direction, wherein said vibration causes said article to be carried in said carrying direction;
   an enclosure section for supporting said cam mechanism; and a balancer for inhibiting a force that acts on said enclosure section due to said cam mechanism applying said vibration to said carry section.

2. An article carrying apparatus according to claim 1, wherein said balancer is a mechanism in which a center of gravity of a weight having a predetermined mass is moved in a direction opposite to said reciprocating linear motion of said carry section.

3. An article carrying apparatus according to claim 2, wherein said balancer is a mechanism in which said weight is rotated around a rotation shaft that is orthogonal to said carrying direction, and said rotation shaft is provided in a position different from the center of gravity of said weight and supported on said enclosure section.

4. An article carrying apparatus according to claim 3, wherein said rotation shaft is provided along a horizontal direction.

5. An article carrying apparatus according to claim 2, wherein a plurality of said weights are provided.

6. An article carrying apparatus according to claim 5, wherein said plurality of weights are divided into a first weight group and a second weight group;
wherein the first weight group and the second weight group are rotated in opposite directions; and wherein
when the centers of gravity of said weight groups are positioned in alignment with said rotation shaft in said carrying direction, the center of gravity of said first weight group and the center of gravity of said second weight group are positioned on the same side with respect to said rotation shaft, and
when the centers of gravity of said weight groups are positioned in alignment with said rotation shaft in a direction. perpendicular to said carrying direction, the center of gravity of said first weight group and the center of gravity of said second weight group are positioned on opposite sides with said rotation shaft interposed therebetween.

7. An article carrying apparatus according to claim 6, wherein the total mass of said first weight group and the total mass of said second weight group are set to be equal.

8. An article carrying apparatus according to claim 6, wherein the total mass of said first weight group and the total mass of said second weight group are set to be different from each other.

9. An article carrying apparatus according to claim 6, wherein the number of said weights in each of said first and second weight groups is one.

10. An article carrying apparatus according to claim 3, wherein said weight is provided with a first gear that rotates around said rotation shaft;
wherein an input shaft for inputting a rotational motion from a predetermined drive source to said cam mechanism is provided with a second gear; and
wherein said first gear and said second gear engage with each other.

11. An article carrying apparatus according to claim 3, wherein a cycle of said reciprocating linear motion of said carry section matches with a cycle of rotation of said weight.

12. An article carrying apparatus according to claim 10, wherein the number of rotations of said weight is an integral multiple of the number of rotations of said input shaft.

13. An article carrying apparatus according to claim 10, wherein the weights that rotate in opposite directions to each other are arranged at positions where said input shaft is interposed therebetween.

* * * * *